US006970960B1

(12) United States Patent
Sarfati

(10) Patent No.: US 6,970,960 B1
(45) Date of Patent: Nov. 29, 2005

(54) INSTREAM LOADER

(75) Inventor: Jean-Claude Sarfati, Epinay sur Seine (FR)

(73) Assignee: Thomson Licensing SA, Boulogne-Billancourt (FR)

( * ) Notice: Subject to any disclaimer, the term of this patent is extended or adjusted under 35 U.S.C. 154(b) by 0 days.

(21) Appl. No.: 09/540,105

(22) Filed: Mar. 31, 2000

Related U.S. Application Data

(63) Continuation of application No. PCT/IB98/01613, filed on Oct. 5, 1998.

(30) Foreign Application Priority Data

Oct. 3, 1997 (EP) ................................ 97402335

(51) Int. Cl.[7] ......................... G06F 13/42; G06F 9/24; H04M 3/00

(52) U.S. Cl. ......................... 710/106; 713/2; 455/418; 717/141; 348/553; 380/227

(58) Field of Search ....................... 380/228; 348/467; 702/155; 709/331, 201, 224; 717/141, 173; 396/57; 701/209; 713/2; 455/418

(56) References Cited

U.S. PATENT DOCUMENTS

| | | | | | |
|---|---|---|---|---|---|
| 4,430,704 | A | * | 2/1984 | Page et al. | 713/2 |
| 5,367,571 | A | * | 11/1994 | Bowen et al. | 380/228 |
| 5,608,732 | A | * | 3/1997 | Bestler et al. | 348/467 |
| 5,666,293 | A | | 9/1997 | Metz et al. | 395/200.5 |
| 5,689,825 | A | * | 11/1997 | Averbuch et al. | 455/418 |
| 5,787,017 | A | * | 7/1998 | Hearing | 702/155 |
| 5,950,005 | A | * | 9/1999 | Elbers et al. | 717/141 |
| 5,961,586 | A | * | 10/1999 | Pedersen | 709/201 |
| 5,987,135 | A | * | 11/1999 | Johnson et al. | 709/224 |
| 5,999,740 | A | * | 12/1999 | Rowley | 717/173 |
| 6,006,039 | A | * | 12/1999 | Steinberg et al. | 396/57 |
| 6,067,500 | A | * | 5/2000 | Morimoto et al. | 701/209 |
| 6,112,025 | A | * | 8/2000 | Mulchandani et al. | 709/331 |

FOREIGN PATENT DOCUMENTS

| | | | | |
|---|---|---|---|---|
| EP | 0 359 292 A2 | | 3/1990 | |
| EP | 0 680 185 A2 | | 11/1995 | |
| EP | 0 680 213 A2 | | 11/1995 | |
| EP | 0 680 216 A2 | | 11/1995 | |
| EP | 0 690 400 A2 | | 1/1996 | |
| EP | 0 752 786 A1 | | 1/1997 | |
| JP | 08305561 A | * | 11/1996 | G06F 9/24 |
| WO | WO 97/20432 | | 6/1997 | |

OTHER PUBLICATIONS

"Coding of Audio, Picture, Multimedia and Hypermedia Information—Generic Coding of Moving Pictures and Associated Audio Information—Part 1: System", ISO/IEC JTC 1/SC 29, ISO/IEC DIS 13818-1; pp 44-45, pp. 86-94.

* cited by examiner

*Primary Examiner*—Glenn A. Auve
*Assistant Examiner*—Christopher E. Lee
(74) *Attorney, Agent, or Firm*—Osha Liang LLP

(57) ABSTRACT

A method of downloading data to a receiver/decoder comprises the steps, at the receiver/decoder, of: receiving a bitstream including the data; downloading a loader for loading the data from the bitstream into the receiver/decoder, and downloading said data from the bitstream using said loader.

34 Claims, 14 Drawing Sheets

INSTREAM LOADER

This is a continuation of International Application PCT/IB98/01613, with an international filing date of Oct. 5, 1998.

This invention relates to:— a method of downloading data to a receiver/decoder;

such a receiver/decoder per se; and a transmission system.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

The advent of digital transmission systems intended primarily for broadcasting television signals, in particular but not exclusively satellite television systems, has opened up the possibility of using such systems for other purposes. One of these is to provide interactivity with the end user. As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommuunications network for multimedia internet applications, to a closed circuit television, and so on.

One way of doing this is to run an application on the receiver/decoder through which the television signal is received. The code for the application could be permanently stored in the receiver/decoder. However, this would be rather limiting. Preferably, the receiver/decoder should be able to download the code for a required application. In this way, more variety may be provided, and applications can be updated as required without any action on the part of the user.

In an MPEG system, application code may be downloaded in MPEG tables transmitted in an MPEG bitstream. The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

Software for downloading the MPEG tables must be stored permanently in the receiver/decoder. In order to download data such as application code or an updated version of a run time engine, complex software is required, this software typically taking up a large amount of memory. However, such software may only be used sporadically, if at all, and so a large amount of memory may be taken up by software which is redundant for a long period of time.

Software stored in the receiver/decoder for downloading data from the bitstream is commonly referred to as a "Bootstrap" loader. The Bootstrap loader is preferably adapted to download most forms of data, including software from the bitstream for storage, for example, in the Flash memory volume of the receiver/decoder. Thus, the Bootstrap loader tends to have a somewhat "basic" structure, having minimal functionality, so that all forms of software can be downloaded.

The Bootstrap loader is typically stored in a ROM memory volume of the receiver/decoder, and is not erasable therefrom. As the Bootstrap loader cannot be modified once it has been written in the ROM memory volume, processing errors which may occur should the Bootstrap loader become corrupted cannot be corrected. In addition, the functionality of the Bootstrap loader is "fixed" once it has been written in ROM; it cannot be updated, for example, in such a manner as to improve the time taken to download data from the bitstream. Thus, software having an improved, or new, structure which is unrecognisable to the Bootstrap loader cannot be downloaded from the bitstream.

If a portion of data stored in the receiver/decoder becomes corrupted, the Bootstrap loader can be used to download a complete uncorrupted version of this data. If only a very small portion of the data has become corrupted, this can result in a significant amount of time being spent downloading the portions of the data which have not become corrupted.

The present invention seeks to solve these and other problems.

In a first aspect, the present invention provides a method of downloading data to a receiver/decoder, comprising the steps, at the receiver/decoder, of:

receiving a bitstream including the data;

downloading a loader for loading the data from the bitstream into the receiver/decoder; and downloading said data from the bitstream using said downloaded data loader.

In one embodiment, the downloaded data loader comprises a data loading program. At least part of the data loader, preferably most of, or even all of the data loader, may be in the form of native code. As used herein, the term "native code" includes hardware specific code, code which is specific to a particular hardware platform of the receiver/decoder, code which is non-interpretive, and/or code which is directly executable by a microprocessor of the receiver/decoder. Thus, the structure taken by a piece of native code to be downloaded by a receiver/decoder will depend on the particular apparatus used in the hardware platform of that receiver/decoder. This is in contrast to "interpretive code", such as that known as "p-code" to the applicants, which requires interpretation by software stored in the receiver/decoder so that it may be executed by the microprocessor, and which therefore is functional over a wide range of hardware platforms. The data downloaded by the data loader may be in the form of native code, p-code, or any other suitable form, such as data tables.

By means of the above, a loader for loading the data from the bitstream is downloaded from the bitstream and stored in, preferably temporarily in RAM of, the receiver/decoder. Following downloading using the data loader of the required data from the bitstream, the downloaded data loader is preferably deleted from the receiver/decoder. Thus, once the downloaded data loader has served its purpose, the storage capacity of the RAM is effectively increased for the time when the downloading of data is not required.

It is of course not essential to delete the downloaded data loader once it has downloaded all of the required data from the bitstream. On the contrary, the data loader may subsequently be stored in non-volatile memory of the receiver/decoder, such as a Flash memory volume. This can enable the receiver/decoder to download further data using the stored data loader without having to reload the data loader from the bitstream, thereby decreasing the time taken to download that data. Thus, a plurality of different data loaders may be stored at any one time in the receiver/decoder.

As a data loader written specifically for the downloading of one particular data item can be downloaded from the bitstream as required by the receiver/decoder, improved functionality of the receiver/decoder may be provided, as data with an updated or revised structure, which is different to the structure of data which can be downloaded by the Bootstrap loader, can be downloaded and stored in the receiver/decoder.

In one preferred embodiment, the downloading of the data is performed by the downloaded data loader. Thus, for the downloading of data, the Bootstrap loader is effectively temporarily replaced by the downloaded data loader, thus enabling an updated or otherwise improved data loader to be used by the receiver/decoder.

Preferably, a portion only of data stored in the receiver/decoder is replaced by a corresponding portion of data downloaded by the downloaded data loader. For example, if a portion of the stored data becomes corrupted or out of date, an uncorrupted or updated version of that portion of the data only can be downloaded by the receiver/decoder, the downloaded data loader "patching" the downloaded portion of data into the stored data where appropriate. Thus the downloaded data loader does not download an entire version of the data stored in the receiver/decoder. This can provide for a significant improvement in the time taken to repair or update stored data, as the downloading of uncorrupted portions of data is not required. In an alternative embodiment, a portion of data stored in the receiver/decoder is replaced by a corresponding portion of, for example, a section of data transmitted with the downloaded data loader.

The bitstream may comprise at least one data loader, and, accordingly, the method may further comprise the steps, at a transmitting system, of:

- for the or each data loader, dividing the data loader into a plurality of modules; and
- for the or each data loader, dividing the data into a respective plurality of modules, each plurality of data modules being associated with a respective plurality of data loader modules.

Thus, the bitstream may include a plurality of data loaders and associated data. This can enable receiver/decoders having different hardware platforms to download the appropriate versions of the data loader and associated data. Data, such as an application, may conveniently be made up of a number of modules, which can be downloaded, and if appropriate run, as required.

The method may further comprise the steps, at the transmitting system, of:

- for the or each data loader, formatting each of the modules as a respective table, the tables having the same respective table identification ("TID") and respective different table identification extensions ("TID-extensions"); and
- for the or each plurality of modules of data, formatting each of the modules of data as a respective table, the tables having the same respective TID as the tables of the data loader modules associated therewith and respective different TID-extensions.

It is preferred that an MPEG protocol is used and, if so, the downloading steps may comprise downloading module MPEG tables.

The tables may have respective different TID-extensions other than a predetermined TID-extension; and the method may further comprise the step, at the transmitting system, of generating a respective directory table for the or each plurality of modules having the same TID, the or each directory table having said predetermined TID-extension and that TID, the directory table containing for each of the modules a name of that module and the respective TID-extension.

The method may further comprise the steps, at the receiver/decoder, of:

- downloading one of the tables having the predetermined TID-extension so as to download a directory table;
- determining from the content of the directory table the TID-extensions of the module tables having the same TID as the directory table; and
- in said downloading steps, downloading the module tables having the same TID as that of the downloaded directory table and TID-extensions determined from the downloaded directory table.

By these features, the directory table can be readily identified because it has a particular TID-extension, and once it has been downloaded it can enable the receiver/decoder to identify the module tables of the data loader from their respective TID-extensions.

The method may further comprise the step, at a transmitting system, of generating a directory table having a predetermined table identification ("TID") and containing, for each of a plurality of version identifications of a receiver/decoder, a respective TID associated with that version identification.

If so, the method may further comprise the steps, at the receiver/decoder, of:

- downloading said directory table having the predetermined TID; and
- determining the version identification of the receiver/decoder,
- wherein the step of downloading a directory table comprises downloading that one of the tables having a TID associated with the version number of the receiver/decoder and the predetermined TID-extension.

Preferably, the version identification includes a code assigned to the manufacturer of the receiver/decoder and a code assigned to the version of the receiver/decoder.

It is expected that receiver/decoders may be designed and manufactured by various different manufacturers. Each manufacturer may produce a number of different versions of the receiver/decoder. Receiver/decoders may therefore have various different hardware designs, though they will of course all conform to the same functional specification. It is therefore important that data, such as an application, behaves in the same way on every receiver/decoder, and that a receiver/decoder should execute all applications in the same, correct manner.

In order to ensure that the data is compatible with a particular version of a receiver/decoder, the bitstream may include a data loader and data for each version identification of the receiver/decoder, and the directory table having the predetermined TID can enable the TID of the modules of the data loader and data for each version identification of the receiver/decoder to be easily identified.

Preferably, the method further comprises the steps, at the transmitting system, of:

- including in each transmitted directory table a directory version identification therefor; and
- at the receiver/decoder:—
  - determining whether the directory version identification of a currently transmitted directory table is more recent than the directory version identification of a previously downloaded directory table having the same TID as the currently transmitted directory table, and if not, aborting the downloading of data.

The Bootstrap loader may be instructed, for example, by an application, periodically to download the directory table to determine whether the directory version identification of the previously downloaded directory table has changed. This can ensure that the receiver/decoder downloads promptly any updated data from the bitstream.

In order to avoid overwriting resident data stored in the receiver/decoder with identical received data, an application requesting updating of the resident data can choose to abort the downloading of data if a table directory is the same as that used in a previous updating of resident data.

Preferably, at least one of the module tables is formatted as a plurality of sections which are transmitted separately in the bitstream, each of the sections containing in a predetermined portion thereof an identification of that section in the table and an indication of the number of the sections in a table.

The method may further comprise the step, at the transmitting system, of cyclically transmitting the tables in a bitstream.

The method may further comprise the step, in a transmitting system, of:

including in the bitstream a data version identification of the data; and, at the receiver/decoder, the step of:

determining whether the data version identification of the received data is more recent than the data version identification of currently stored data, and if so, performing said step of downloading said data from the bitstream.

By this feature, the downloading can be aborted prior to erasing the resident software and/or commencing the downloading of the received data if the data version identification of the received data is the same as that of resident data stored in the receiver/decoder.

Preferably, the step of determining whether the data version identification of the received data is more recent than the data version identification of currently stored data is conducted after determining that the data version identification of a currently transmitted directory table is more recent than the data version identification of a previously downloaded directory table having the same TID as the currently transmitted directory table.

In another preferred embodiment, the downloaded data loader modifies means stored in the receiver/decoder for downloading the data loader, so that the data can be downloaded by the modified downloading means. Thus, the downloading means can be modified conveniently by a data loader downloaded from the bitstream so that, for example, data with a different structure may be downloaded by the downloading means.

Preferably, the method comprises the steps, at a transmitting system, of;

transmitting a second data loader included in said bitstream; and at the receiver/decoder, of:

downloading the second data loader; and downloading one of the first-mentioned data loader and the data; said transmitted downloading means performing the downloading of one of the first-mentioned data loader and the data.

In one embodiment, the second data loader is provided by another data loading program, at least part of the second loader preferably being in the form of native code.

This can enable downloading of a data loader to be avoided by using a different data loader previously downloaded from the bitstream. Thus, it is not necessary to download a data loader from the bitstream every time fresh or revised data is to be downloaded if a previously downloaded data loader is able to download the data as efficiently as the data loader. This can reduce significantly the time taken to download fresh or revised data from the bitstream. The second data loader may provide improved functionality over the first-mentioned data loader, for example, the second data loader may be able to download computer programs.

In a second aspect, the present invention provides a receiver/decoder comprising:

a receiver for receiving a bitstream including data;

storage means, such as a memory; and downloading means for downloading from the bitstream into the storage means a loader for loading the data from the bitstream into the receiver/decoder.

In one preferred embodiment, the downloading means is provided by a boot program stored in the receiver/decoder.

The receiver/decoder may further comprise means for deleting the downloaded data loader from the storage means after the data has been downloaded from the bitstream. The deleting means may be provided by a central processor and associated software stored in the receiver/decoder.

The receiver/decoder may be arranged to download tables. If so, the downloading means may be arranged to download a table having a table identification ("TID") and a predetermined table identification extension ("TID-extension") so as to download a directory table, to determine from the content of the directory table the TID-extensions of module tables having the same TID as the directory table, and to download the module tables having the same TID as that of the downloaded directory table and TID-extensions determined from the downloaded directory table so as to download said loader.

The downloading means may be arranged to download a directory table having a predetermined TID and containing, for each of a plurality of version identifications of a receiver/decoder, a respective TID associated with that version identification, to determine the version identification of the receiver/decoder, and to download a directory table having a TID associated with the version number of the receiver/decoder and the predetermined TID-extension.

In a preferred embodiment, the downloading means is arranged to determine whether a version identification of a currently transmitted directory table is more recent than the version identification of a previously downloaded directory table having the same TID as the currently transmitted directory table, and if not, to abort the downloading of said loader.

The receiver/decoder may further comprise a parallel port and/or a serial port arranged to receive data formatted as at least one table.

Preferably, said downloading means is arranged to download a second data loader included in said bitstream for downloading one of the first-mentioned data loader and the data.

In a third aspect, the present invention provides a transmission system comprising:

means, such as a transmitter, for transmitting a bitstream including native code comprising at least one data loader for loading data into a receiver/decoder and data associated with the or each data loader; and means, such as a data server, for dividing the or each data loader into a plurality of modules and dividing the data associated with the or each data loader into a respective plurality of modules for transmittal by said transmitting means.

Preferably, the transmission system further comprises:

means for formatting each of the modules of the or each data loader as a respective table, the tables of the or each data loader having the same respective table identification ("TID") and respective different table identification extensions ("TID-extensions"); and means for formatting each of the modules of the data associated with the or each data loader as a respective table, the tables of the modules of data having the same respective TID as the tables of the data loader modules associated therewith and respective different TID-extensions.

The formatting means may be conveniently provided by the data server.

The tables may have respective different TID-extensions other than a predetermined TID-extension, and the system may further comprise means for generating a respective directory tables for the or each plurality of modules having the same TID, each directory table having that TID and said predetermined TID-extension, the directory containing for each of the modules a name of that module and the respective TID-extension.

The transmission system may further comprise:

means for generating a directory table having a predetermined table identification ("TID") and containing, for each of a plurality of version identifications of a receiver/decoder, a respective TID associated with that version identification.

The transmission system may further comprise means for including in each transmitted table a version identification therefor.

Each of the aforementioned means may conveniently be provided by the data server.

A fourth aspect of the present invention provides a combination of a receiver/decoder as described above and a transmission system as described above.

A fifth aspect of the present invention provides a signal comprising at least one loader for loading data into a receiver/decoder, and data associated with the or each data loader, the or each data loader being divided into a plurality of modules and the data associated with the or each data loader being divided into a respective plurality of modules.

All the features of the method aspect of the invention can be applied to the apparatus and signal aspects as appropriate, and vice versa.

Preferred features of the present invention will now be described, purely by way of example, with reference to the accompanying drawings, in which:—

FIGS. 13 A–D illustrate the procedure for downloading data.

Figure 1:
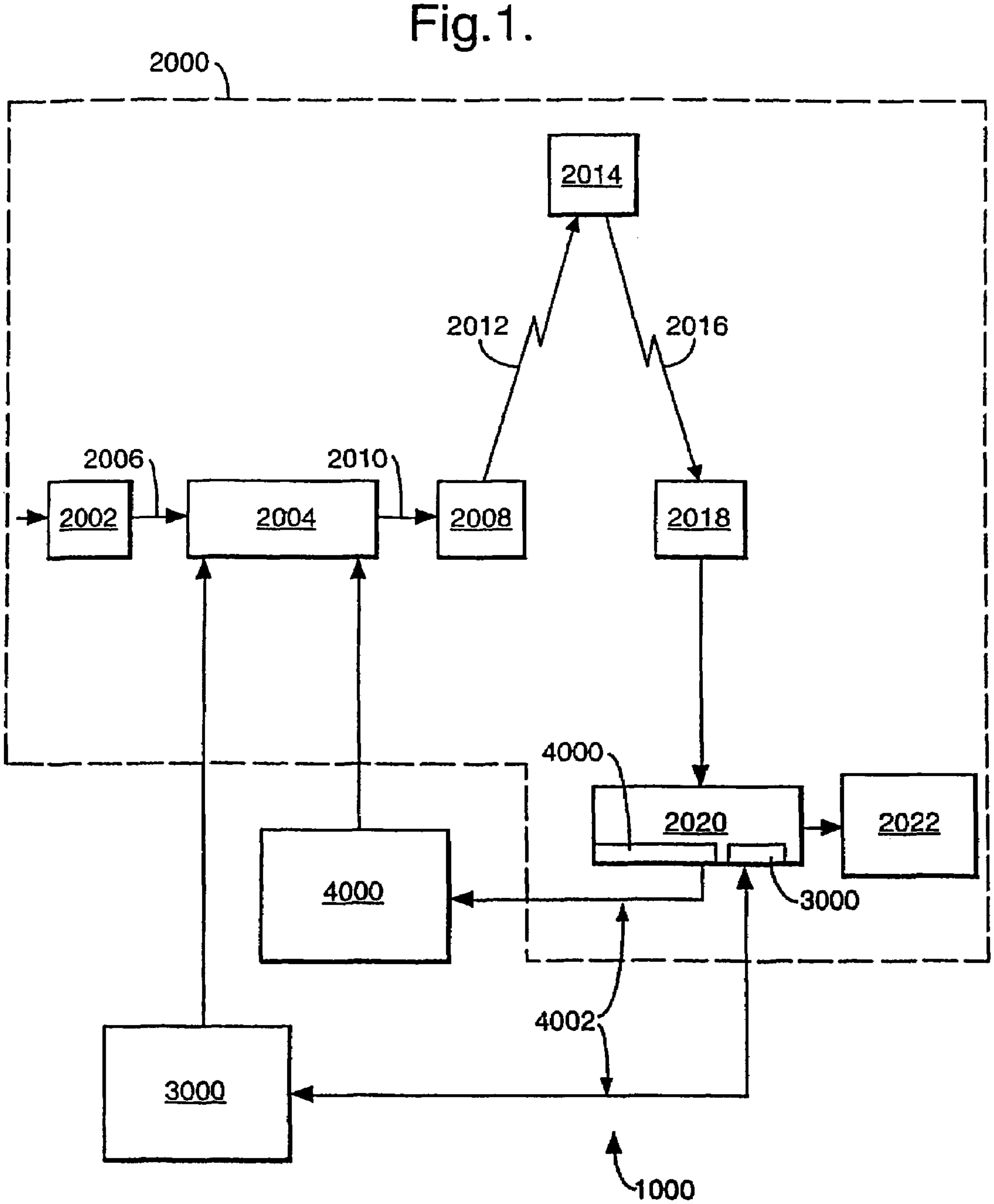
FIG. 1 shows the overall architecture of a digital television system.

An overview of a digital television system 1000 is shown in FIG. 1. The digital television system 1000 includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecommunications links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2020. Using the decoder 2020 and smartcard, the end user may purchase commercial offers in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

Figure 2:
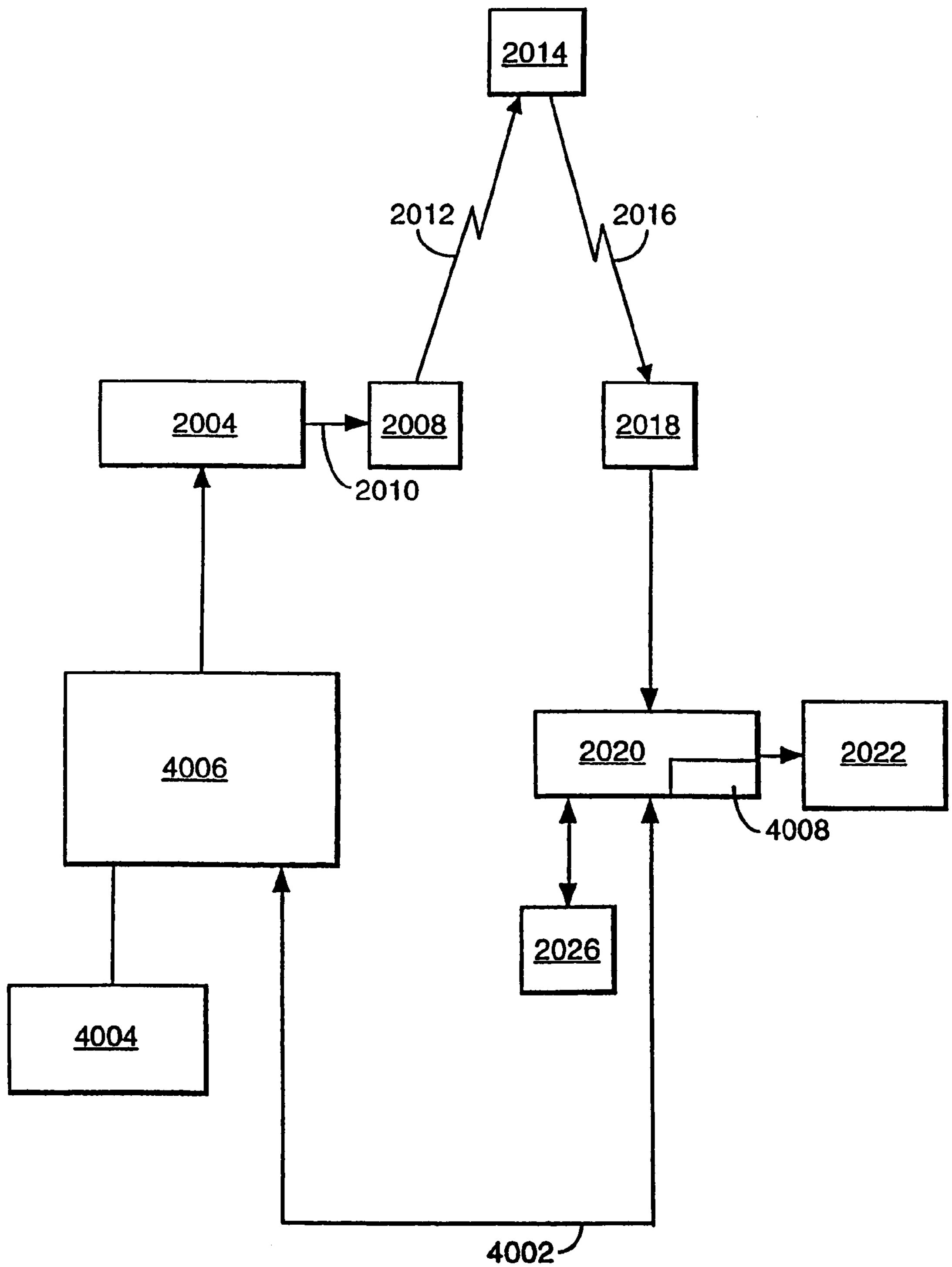
FIG. 2 shows the architecture of an interactive system of the digital television system of FIG. 1.

FIG. 2 shows the general architecture of the interactive television system 4000 of the digital television system 1000.

For example, the interacting system 4000 allows an end user to buy items from on-screen catalogues, consult local news and weather maps on demand and play games through their television set.

The interactive system 4000 comprises in overview four main elements:— an authoring tool 4004 at the broadcast centre or elsewhere for enabling a broadcast supplier to create, develop, debug and test applications;

an application and data server 4006, at the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user;

a virtual machine intending a run time engine (RTE) 4008, which is an executable code installed in the receiver/decoder 2020 owned or rented by the end user for enabling an end user to receive, authenticate, decompress, and load applications into the working memory of the decoder 2020 for execution. The engine 4008 also runs resident, general-purpose applications. The engine 4008 is independent of the hardware and operating system; and a modemmed back channel 4002 between the receiver/decoder 2020 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. A "memory volume" of the receiver/decoder is a storage space for modules. Modules may be downloaded into the receiver/decoder 2020 from the MPEG-2 transport stream.

Figure 3:
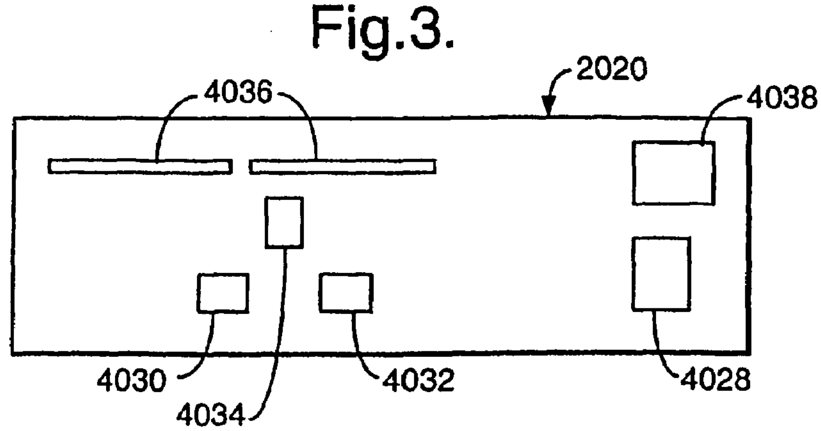
FIG. 3 is a schematic diagram of interfaces of a receiver/decoder forming part of the system of FIGS. 1 and 2.

Physical interfaces of the receiver/decoder 2020 are used for downloading data. With reference to FIG. 3, the decoder 2020 contains, for example, six downloading devices; MPEG flow tuner 4028, serial interface 4030, parallel interface 4032, modem 4034 and two card readers 4036. The receiver/decoder 2020 may also include a display 4038.

Figure 4:
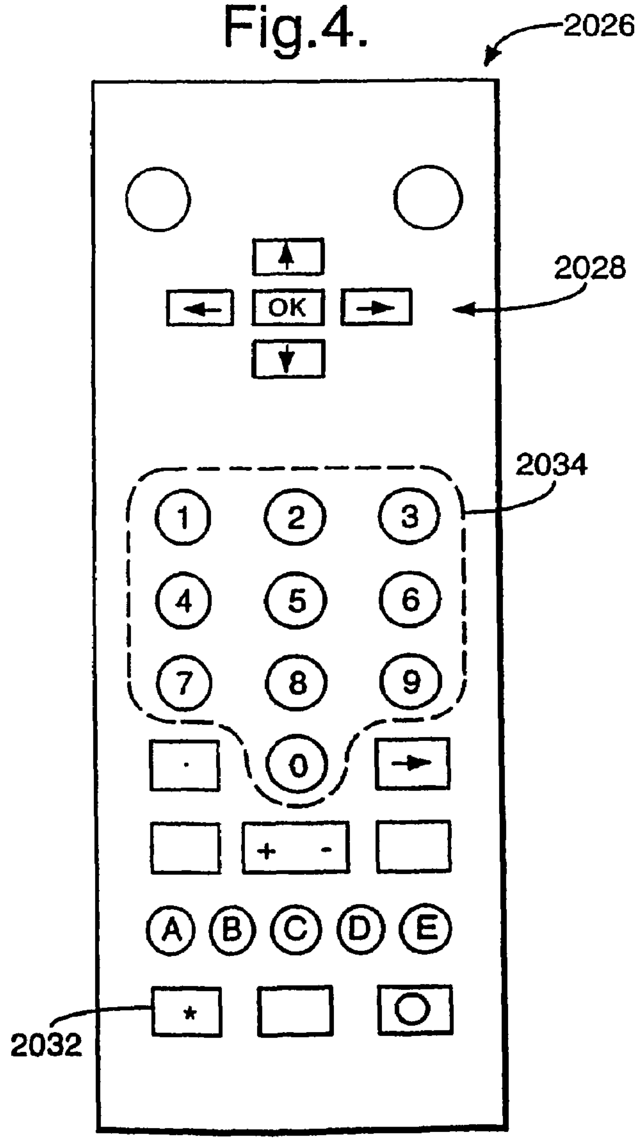
FIG. 4 is a schematic diagram of a remote controller used in the digital television system.

For the purposes of this specification, an application is a piece of computer code for controlling high level functions of preferably the receiver/decoder 2020. For example, when the end user positions the focus of a remote controller 2026 (as shown in more detail in FIG. 4) on a button object seen on the screen of the television set 2022 and presses the validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM (or FLASH) of the decoder 2020.

Examples of applications are:—

An Initiating Application. The receiver/decoder 2020 is equipped with a resident initiating application which is an adaptable collection of modules (this term being defined in more detail hereunder) enabling the receiver/decoder 2020 to be immediately operative in the MPEG-2 environment. The application provides core features which can be modified by the broadcast supplier if required. It also provides an interface between resident applications and downloaded applications.

A Startup Application. The startup application allows any application, either downloaded or resident, to run on the receiver/decoder 2020. This application acts as a bootstrap executed on arrival of a service in order to start the application. Startup is downloaded into RAM and therefore can be updated easily. It can be configured so that the interactive applications available on each channel can be selected and run, either immediately after downloading or after preloading. In the case of preloading, the application is loaded into the memory 2024 and is activated by the startup when required.

A Program Guide. The Program Guide is an interactive application which gives full information about programming. For example, it may give information about, say, one week's television programmes provided on each channel of a digital television bouquet. By depressing a key on the remote controller 2026, the end user accesses an add-on screen, overlaid on the event shown on the screen of the television set 2022. This add-on screen is a browser giving information on the current and next events of each channel of the digital television bouquet. By depressing another key on the remote controller 2026, the end user accesses an application which displays a list of information on events over one week. The end user can also search and sort events with simple and customised criteria. The end user can also access directly a selected channel.

A Pay Per View application. The Pay Per View Application is an interactive service available on each PPV channel of the digital television bouquet in conjunction with the conditional access system 3000. The end user can access the application using a television guide or channel browser. Additionally, the application starts automatically as soon as a PPV event is detected on the PPV channel. The end user is then able to buy the current event either through his daughter smartcard 3020 or via the communication server 3022 (using a modem, a telephone and DTMF codes, MINITEL or the like). The application may be either resident in the ROM of the receiver/decoder 2020 or downloadable into the RAM of the receiver/decoder 2020.

An Internet Browser application. In one example of the Internet browser application, instructions from the user, such as a request to view a web page having a particular URL, are entered using the remote controller 2026, and these are sent by the modemmed back channel 4002 to the application and data server 4006. The appropriate web page is then included in the transmissions from the broadcast centre, received by the receiver/decoder 2020 via the uplink 2012, transponder 2014 and downlink 2016, and displayed on the television 2022.

Applications are stored in memory locations in the receiver/decoder 2020 and represented as resource files. The resource files comprise graphic object description unit files, variables block unit files, instruction sequence files, application files and data files.

The graphic object description unit files describe the screens, the man-machine interface of the application. The variables block unit files describe the data structures handled by the application. The instruction sequence files describe the processing operations of the applications. The application files provide the entry points for the applications.

The applications constituted in this way can use data files, such as icon library files, image files, character font files, colour table files and ASCII text files. An interactive application can also obtain on-line data by effecting inputs and/or outputs.

The engine 4008 only loads into its memory those resource files it needs at a given time. These resource files are read from the graphic object description unit files, instruction sequence files and application files; variables block unit files are stored in memory following a call to a procedure for loading modules and remain locked there until a specific call to a procedure for unloading modules is made.

Figure 5:
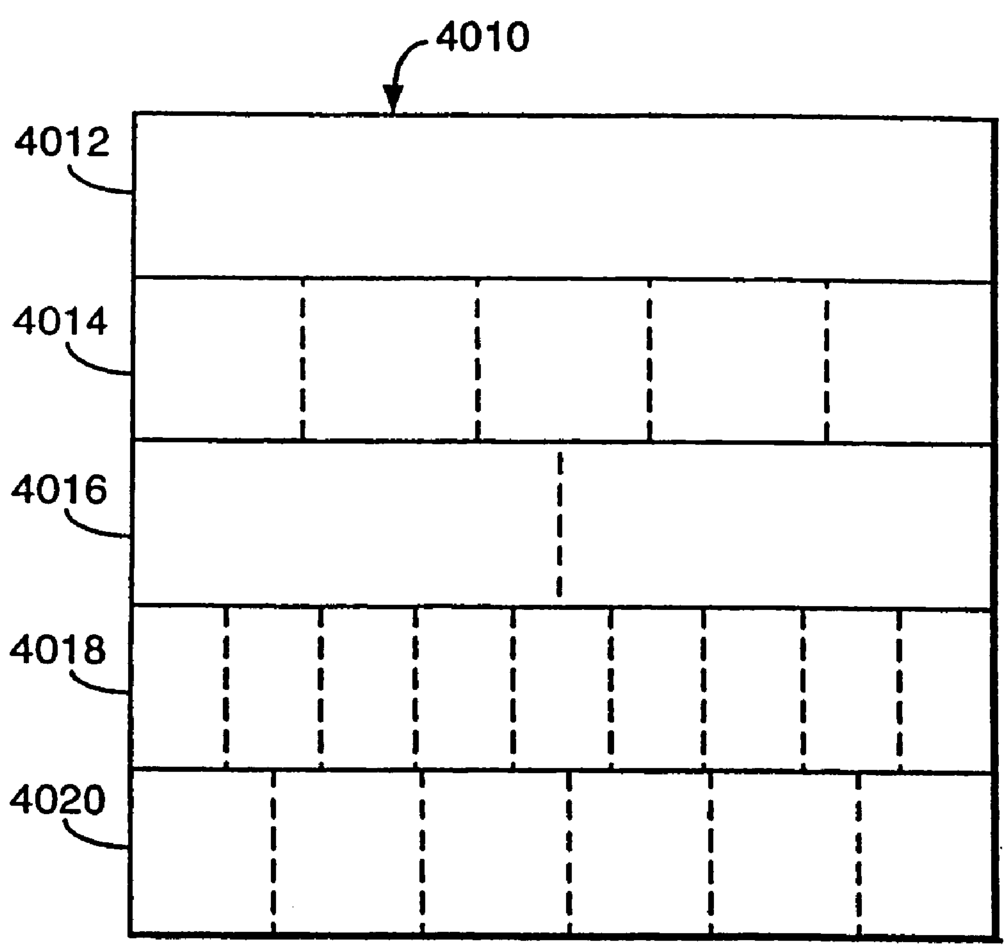
FIG. 5 shows the arrangement of files within a module downloaded into the memory of an interactive receiver/decoder.

With reference to FIG. 5, a module 4010, such as a tele-shopping module, is a set of resource files and data comprising the following:

a single application file 4012;

an undetermined number of graphic object description unit files 4014;

an undetermined number of variables block unit files 4016;

an undetermined number of instruction sequence files 4018; and where appropriate, data files 4020 such as icon library files, image files, character font files, colour table files and ASCII text files.

The concept of modules 4010 together with the concept of downloading small pieces of code allows the easy evolution of applications. They can be downloaded into permanent FLASH memory of the decoder 2020 as resident software or broadcast in order to be downloaded into the RAM of the decoder 2020 only when needed by the end user.

In the case of MPEG flow, one module 4010 is transported in one single MPEG table. In the case of modules transmitted to the MPEG tuner 4028, the long MPEG-2 format is used, with a long header and a CRC code. This is also the case with the five other interfaces (serial interface 4030, parallel interface 4032, modem 4034 and two card readers 4036), except that the "short" MPEG-2 format with a shorter header and no. CRC is used.

Figure 6:
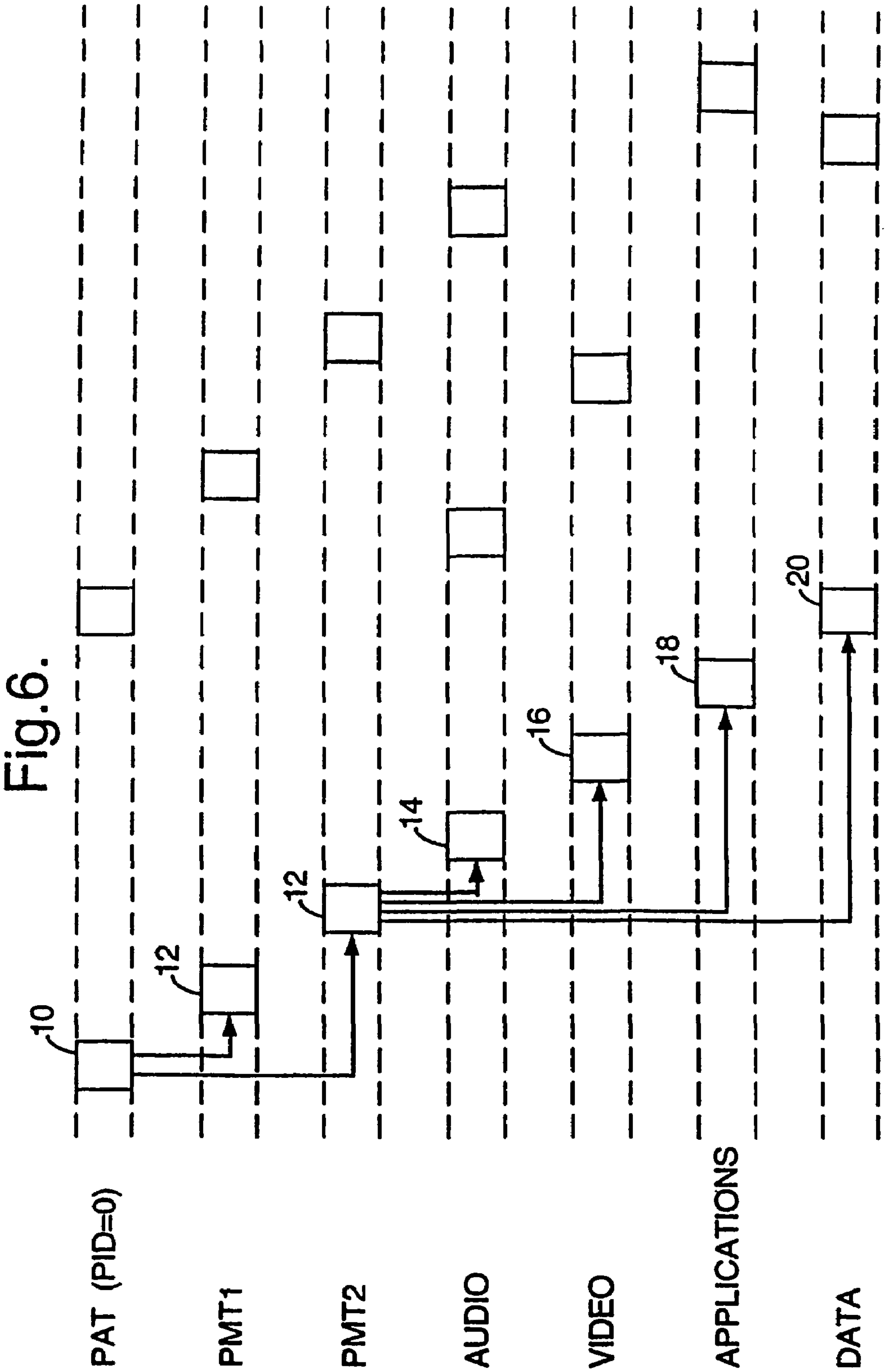
FIG. 6 illustrates an interrelationship between a number of components of an MPEG stream.

Referring in particular to FIG. 6, as is known, the MPEG-2 bitstream includes a programme access table ("PAT") 10 having a packet identification ("PID") of 0. The PAT contains references to the PIDs of the programme map tables ("PMTs") 12 of a number of programmes. Each PMT contains a reference to the PIDs of the streams of the audio MPEG tables 14 and video MPEG tables 16 for that programme. A packet having a PID of zero, that is the programme access table 10, provides the entry point for all MPEG access.

In order to download applications and data for them, two new stream types are defined, and the relevant PMT also contains references to the PIDs of the streams of application MPEG tables 18 (or sections of them) and data MPEG tables 20 (or sections of them).

Figure 7:
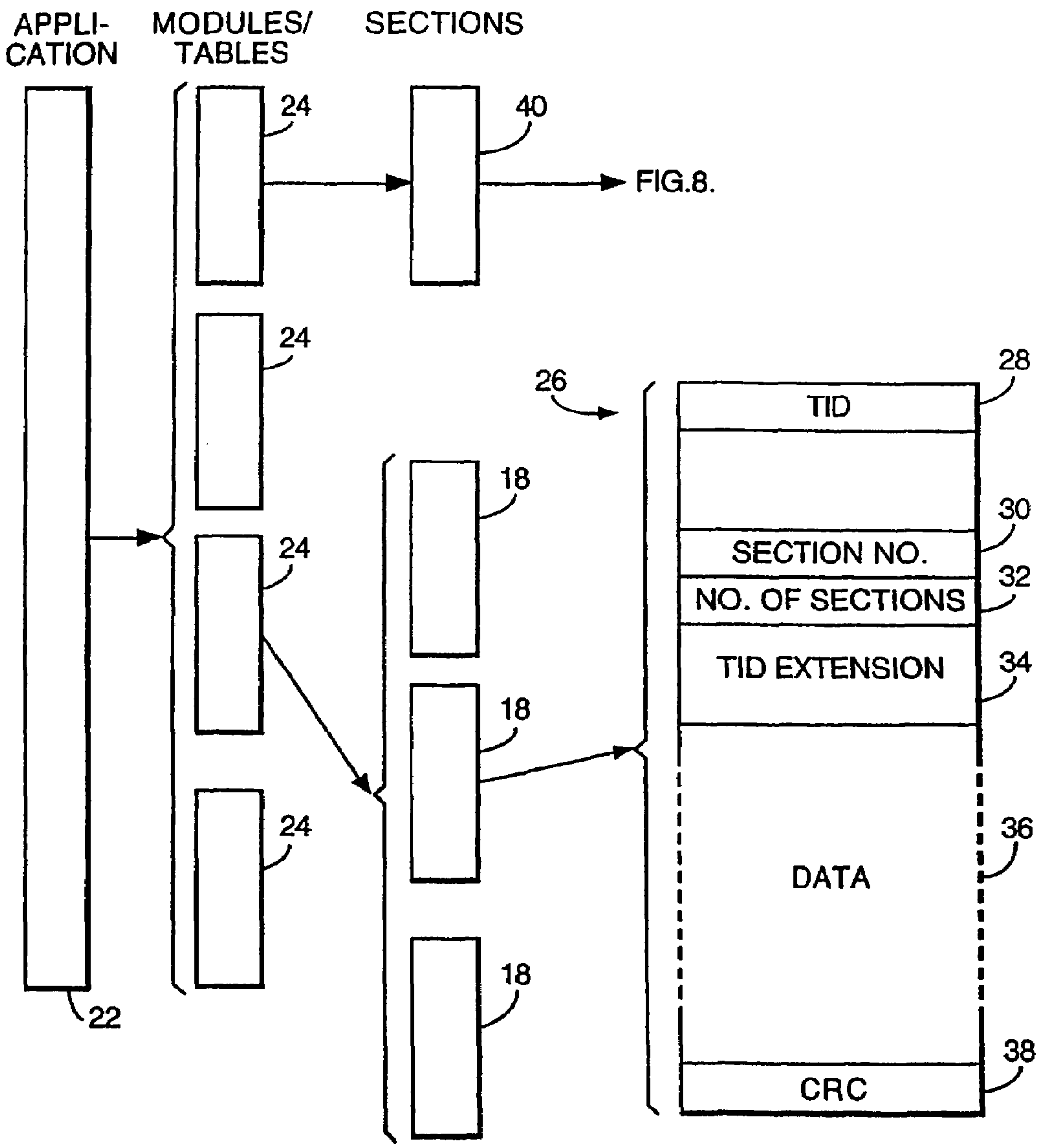
FIG. 7 illustrates how an application may be made up of modules/tables, which in turn may be made up of sections.

Referring to FIG. 7, in order to download an application 22, the application is divided into modules 24 each formed by an MPEG table, some of which are made up by a single section 18, and others of which may be made up by a plurality of sections 18. A typical section 18 has a header 26, which includes a one-byte table identification ("TID") 28, the section number 30 of that section in the table, the total number 32 of sections in that table and a two-byte TID extension 34. Each section also includes a data part 36 and a CRC 38. For a particular module/table 24, all of the sections 18 making up that table 24 have the same TID 28 and the same TID extension 34. For a particular application 22, all of the tables 24 making up that application 22 have the same TID 28, but different respective TID extensions.

Figure 8:
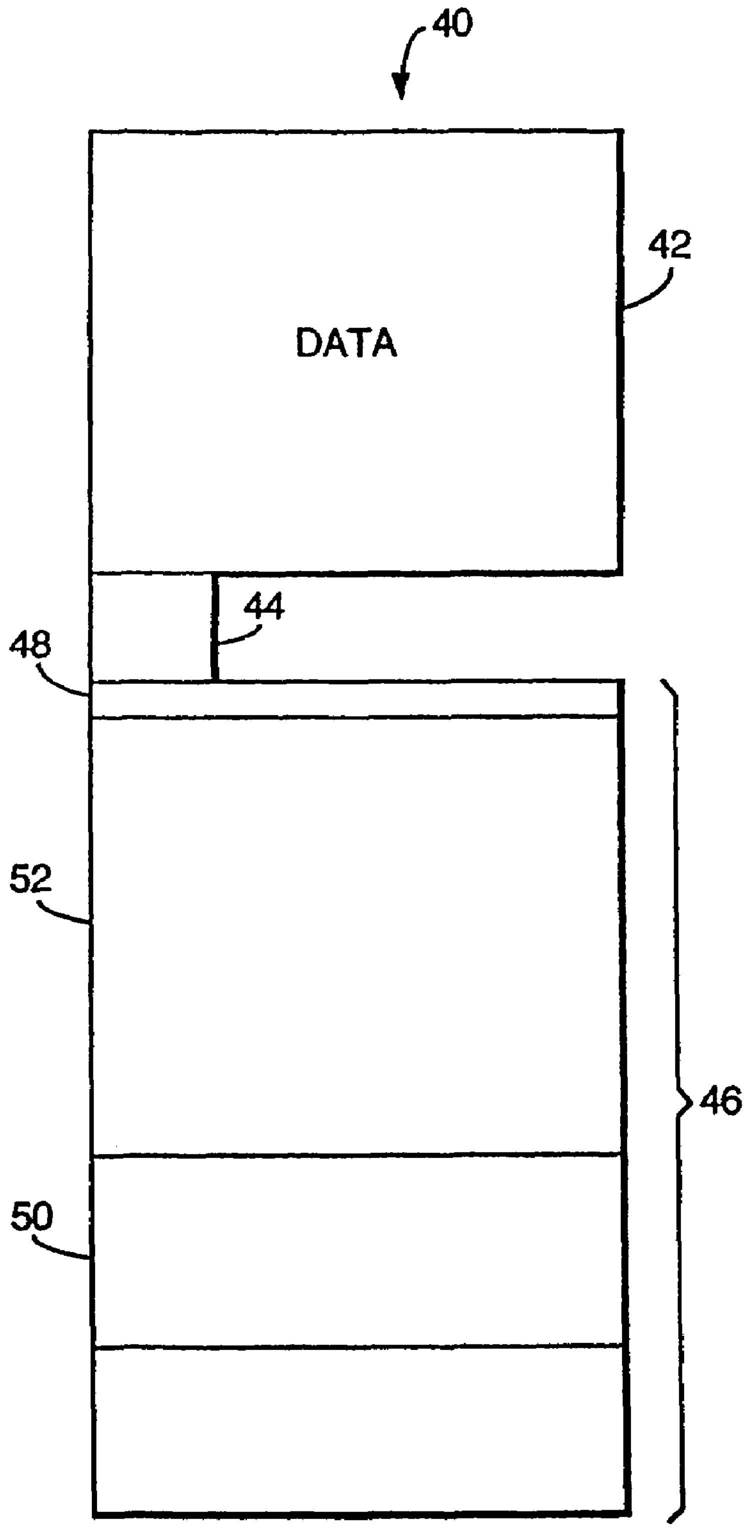
FIG. 8 illustrates the authentication of an MPEG table.

The authentication of an MPEG table will now be described with reference to FIG. 8. The table 40 includes data 42 (typically comprising header 26, TIED 28, TID extension 34 and data part 36), a key identification 44 and a cipher area 46. The key identification 44 comprises a 1-byte identification of a particular private key to be used to encrypt the block. The cipher area 46 comprises a block of 96 bytes of data. The first byte 48 is zero. A 16 byte signature 50 begins at an offset of typically between 0 and 31 bytes after the first byte. The signature 50 is produced using the known MD5 signature generating process on the data 42. Dummy data 52 is inserted between the first byte and the signature 50 and the block is encrypted using a known encryption process and the private key to which the key identification 44 corresponds.

If a plurality of MPEG tables are to be authenticated, then a directory listing the names of the tables and the signatures of those tables is included in the carrier signal. In the case of MPEG flow, this directory is transported in one single MPEG table, typically having a TID extension 34 of zero. The directory table is authenticated with the mechanism described above. Once the directory has been downloaded from the carrier signal it is possible for the application to download one or more of the MPEG tables listed in the directory.

Figure 9:
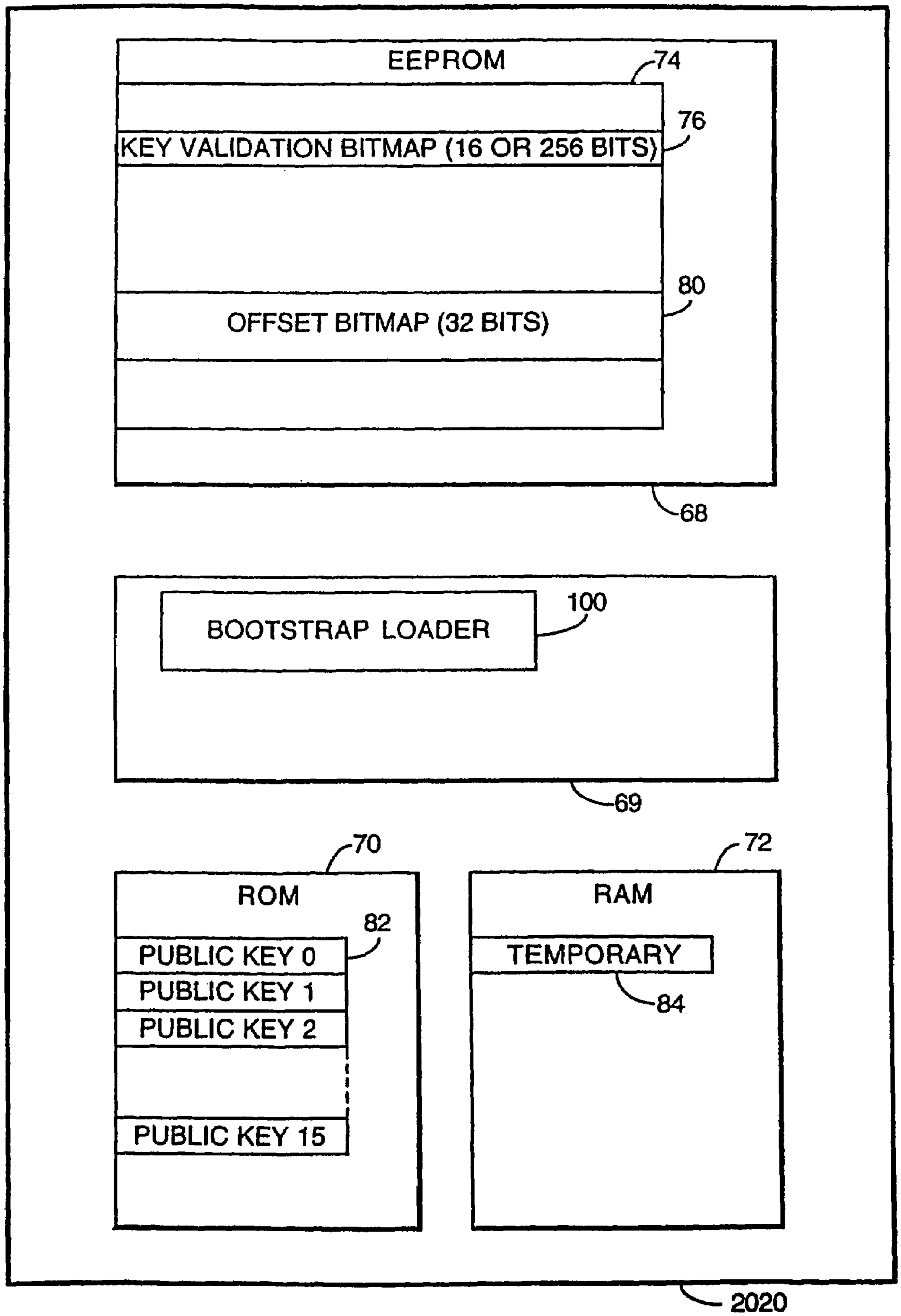
FIG. 9 illustrates various areas of memory in a receiver/decoder of the television system.

The operation of the receiver/decoder 2020 in dealing with signatures and decryption during downloading of an application will now be described. Referring to FIG. 9, the receiver/decoder 2020 includes EEPROM 68, FLASH 69, ROM 70 and RAM 72. The EEPROM 68 includes a protected region 74 which is used by the virtual machine, and where only the virtual machine (and not a normal application) can write. The protected region 74 includes a key validation bitmap 76 of 16 or 256 bits, and an offset bitmap 80 of 32 bits. The ROM 70 includes, in one embodiment, sixteen public keys 82, in which case a 16-bit key validation bitmap is employed, and in another embodiment 256 public keys, in which case a 256-bit key validation bitmap is employed. The public keys are identified by their physical locations in the ROM 70, or they may alternatively be included in a lookup table, whereby a particular key identification will yield the corresponding public key. The RAM 72 may be used to store a temporary key 84.

When an application is to be downloaded, firstly the directory table having the predetermined TID for that application and a TID extension of zero is downloaded. The key identification 44 is then extracted from the directory table and a check is made of the key validation bitmap 76 in the protected memory 74 that the bit corresponding to the extracted key identification 44 is set. If it is not, then further downloading of the application is aborted. However, if the appropriate key is set, then a public key 82 is selected from the ROM 70 corresponding to the extracted key identification 44. The selected public key and a known decryption process are then used to decrypt the encrypted block 46 in the directory table 40 to produce a decrypted block. The offset contained in the offset bitmap 80 in the protected memory 74 is looked up, or, if more than one offset bit is set, each offset bit is looked up in turn, and sixteen bytes of data are extracted from the decrypted block starting with the looked-up offset. For the or each looked-up offset, the 16 bytes are treated as the signature transmitted with the directory table 40. The signature of the entries in the directory 42 of the directory table 40 is calculated using the known MD5 process, and this calculated signature is compared with the signature extracted from the decrypted block. If the two signatures for the or each looked-up offset do not match, then further downloading of the application is aborted. However, if one of the signatures matches, then downloading of the modules specified in the directory 42 can proceed. As mentioned above, in order to download a particular module, the TID extension for that module is obtained from the directory 42, and the MPEG table 24 or sections 18 with the same TID as the directory table and with the obtained TID extension is downloaded. Once the module MPEG table has been downloaded, the receiver/decoder 2020 calculates the signature of the downloaded table using the known MD5 process and then compares that calculated signature with the signature contained in the directory entry. If the signatures match, then the module is accepted, but if they do not match, then the module is rejected.

All of the modules of the application can thus be downloaded in the manner specified above, and the application can be run by the receiver/decoder 2020.

The downloading of data into the receiver/decoder 2020 will now be described in more detail with reference to FIGS. 9 to 13.

The receiver/decoder 2020 includes loader 100, referred to as a "Bootstrap" loader 100, which is used primarily to download a loader for downloading software, such as manufacturer firmware, the run time engine 4008 and applications, present in the MPEG datastream for storage in the FLASH memory 69 of the receiver/decoder 2020. The Bootstrap loader 100 is stored in the FLASH memory 69 of the receiver/decoder 2020 and typically is not erasable therefrom. The Bootstrap loader 100 functions under the control of the hardware of the receiver/decoder 2020 and software stored therein.

Writing/updating of software stored in the receiver/decoder may be performed:

- at the request of the user of the receiver/decoder 2020;
- at the request of an application stored in the receiver/decoder 2020; or
- if the software previously stored in the receiver/decoder 2020 (referred to as "resident" software) has become corrupted.

To determine whether resident software has become corrupted, software written by the manufacturer of the receiver/decoder 2020 and stored therein calculates a checksum on the resident software data and compares this to a checksum written in the resident software. If the two values of the checksum are not equal, the resident software has become corrupted.

The FLASH memory 69 and EEPROM 68 of the receiver/decoder 2020 contain parameters which enable the Bootstrap loader 100 to download a loader in the form of native code from the bitstream. Parameters may be stored in the Bootstrap loader 100 itself, that is, in FLASH memory 69, or in EEPROM 68. Examples of parameters which may be stored in the FLASH memory 69 include:

- the frequency to which the transponder 2014 is tuned;
- various characteristics of the signal to be demodulated by the receiver/decoder 2020;
- the PID upon which software is to be transmitted;
- a set of public keys (preferably three keys) to be used during authentication;
- a time-out for the loading of directory tables from the MPEG bitstream;
- the version number of the Bootstrap loader 100; and
- an N byte "checksum" parameter used to check the integrity of resident software, the value of which is determined by the manufacturer of the receiver/decoder 2020.

Examples of parameters stored in the EEPROM 68, and which may be updated by an application stored in the receiver/decoder 2020, include:

- further characteristics of the signal to be demodulated by the receiver/decoder 2020; and
- parameters which enable a report on a writing/updating to be compiled.

Figure 10:
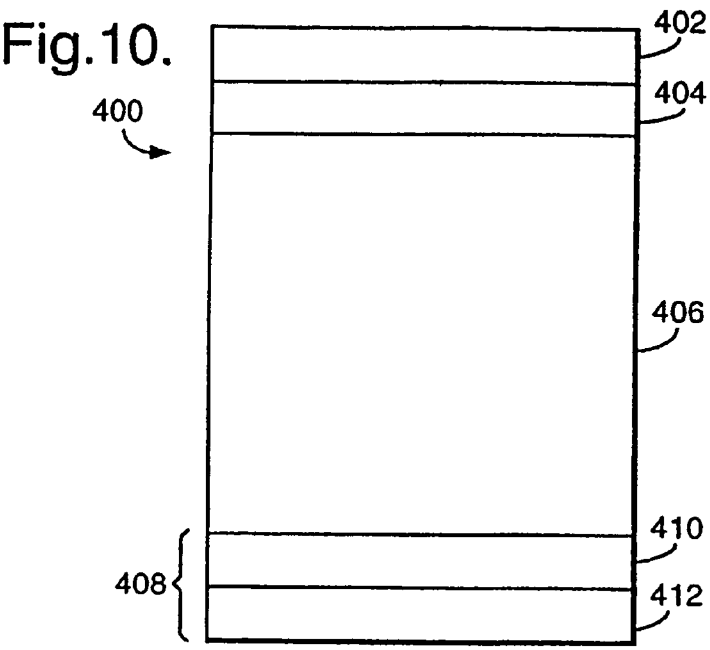
FIG. 10 illustrates a parameters field.

These parameters are stored in respective parameter fields in the FLASH memory 69 or EEPROM 68. With reference to FIG. 10, each parameter field 400 includes a length 402, a reserved byte 404, a set of parameters 406 and a Longitudinal Redundancy Code (LRC) checksum 408. The checksum comprises CRL 410, which is an exclusive-OR of the preceding bytes of the parameter field 400, and NCRL 412, which is the 1's complement of the CRL 410. If an application stored in the receiver/decoder 2020 wishes to update the parameters stored in a parameter field, for example, to update a PID, it calculates an LRC checksum for the field and compares that with the LRC checksum 410 stored in the field. If the two values match, then updating of the parameter field is enabled; if not, the updating of the parameter field is aborted.

The MPEG bitstream including the data to be downloaded into the receiver/decoder 2020 carries native code, at least part of which includes an additional loader, referred to as an "Instream" loader. The Bootstrap loader 100 downloads the Instream loader from the MPEG bitstream into RAM 72 of the receiver/decoder 2020, and it is this Instream loader which downloads the data from the MPEG bitstream, for example, in order to update the resident software.

The software downloaded into the FLASH memory 69 of the receiver/decoder 2020 may also contain a loader, referred to as a "Resident" loader. This loader should at least be able to perform a writing/update of software from the MPEG bitstream, and may offer other features, such as updates from local ports, and may allow the video and audio data in the MPEG bitstream to be decoded. The Resident loader is loaded from the bitstream at the request of an application, for example, to complement the loader which performs the downloading of the Instream loader, or for loading data from the bitstream. For example, if writing/updating is requested by an application stored in the receiver/decoder 2020 and the resident software is not corrupted, the Resident loader is used to perform the update instead of an Instream loader. This can reduce the time taken to update software in the receiver/decoder. At least part of the Resident loader is in the form of native code.

Figure 11:
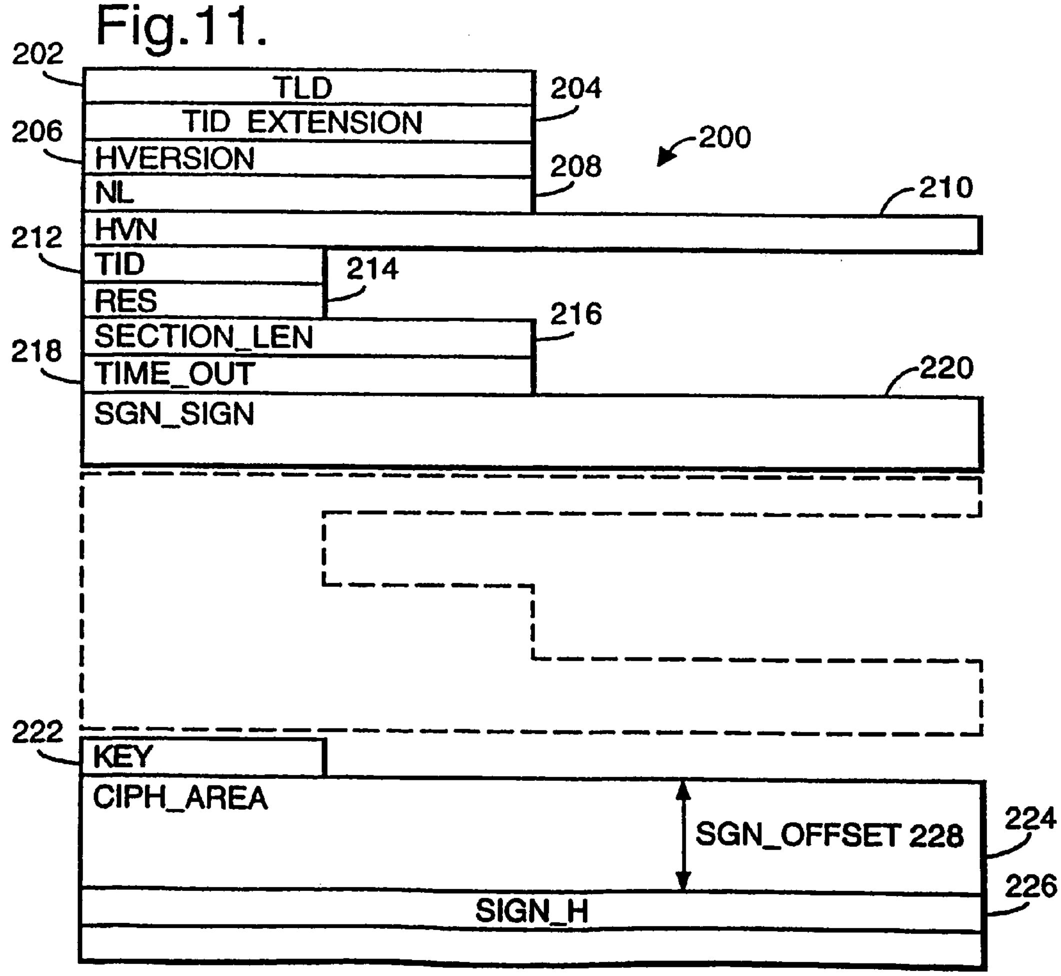
FIG. 11 illustrates a hardware directory table.

The various MPEG tables included in the MPEG bitstream which allow a receiver/decoder 2020 to locate and download the required software will now be described with reference to FIGS. 11 and 12.

The MPEG bitstream includes at least one hardware directory table 200 and a plurality of loader directories 300.

A hardware directory table 200 enables the Bootstrap loader 100 to locate the correct versions of the Instream loader and the software to be downloaded for a number of different versions of the receiver/decoder 2020. With reference to FIG. 11, a hardware directory table 200 includes a TID 202 of DO and a TID extension 204 of 0000, which values are previously stored in the EEPROM 68 of the receiver/decoder 2020 to enable, for example, the Bootstrap loader 100 to locate and download the hardware directory table 200.

The hardware directory table 200 includes:

- a version number, HVERSION 206, of the hardware directory 200. The version number is increased each time there is a change in the content of the hardware directory 200;
- the number, NL 208, of Instream loader descriptions contained in the hardware directory 200;
- for each version of the receiver/decoder 2020:
  - an identifier, HVN 210, of a version number of such a receiver/decoder 2020;
  - the TID 212 of the MPEG tables used for the loader directory 300 associated with that HVN 210, the Instream loader and the software to be downloaded;
  - a redundant byte, RES 214;
  - a maximum size, SECTION_LEN 216, of a section of the MPEG table used for the loader directory 300 associated with that HVN 210;
  - a value, TIME_OUT 218, of the time-out for the loading of the loader directory 300 associated with the HVN 210; and
  - the value, SGN_SIGN 220, of the signature of the loader-directory associate with the HVN 210;

an identification, KEY 222, of the private key used for the authentication of the hardware directory 200; and a ciphered area, CIPH_AREA 224, containing the signature SIGN_H 226 of the hardware directory 200, the signature being offset from the beginning of the CIPH_AREA 224 by a signature offset SGN_OFFSET 228.

The HVN 210 of the receiver/decoder is 4 bytes in length. One byte is reserved for future use, two bytes include a code for the version number of the hardware in the receiver/decoder, and one byte includes a code for the manufacturer of the receiver/decoder. This enables the Bootstrap loader to download the version of the Instream loader which is compatible with the hardware platform of the receiver/decoder.

Having downloaded the hardware directory table 200, the Bootstrap loader 100 searches the table 200 for an entry corresponding with the HVN 210 of the receiver/decoder 2020. If a match does not occur, the downloading is aborted. If a match occurs, the Bootstrap loader 100 identifies from the table 200 the TID 212 that has been assigned to the loader directory 300 associated with the HVN 210 of the receiver/decoder 2020, the Instream loader and the software to be downloaded.

Figure 12:
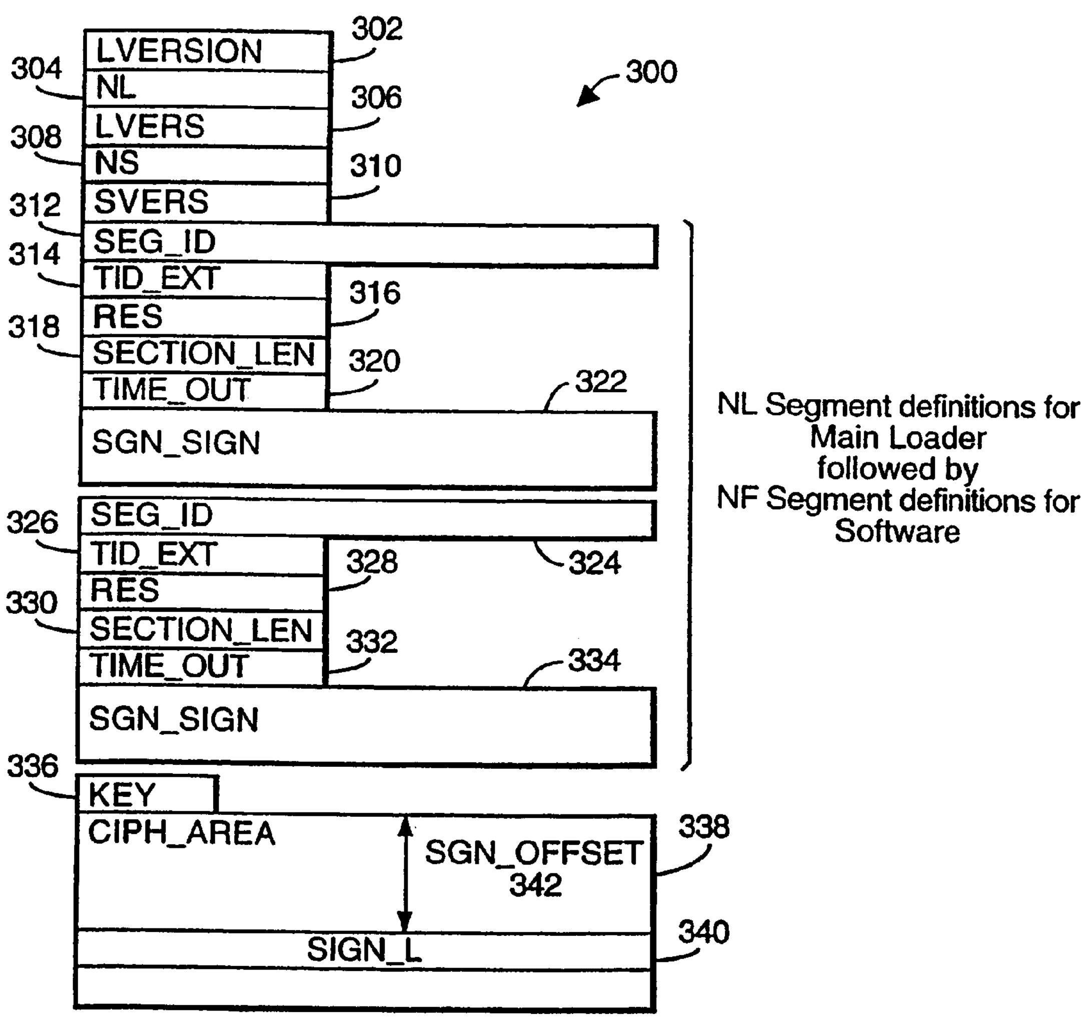
FIG. 12 illustrates a loader directory table.

With reference to FIG. 12, each loader directory 300 associated with the HVN 210 of the receiver/decoder 2020 includes:

a version number, LVERSION 302, of the loader directory 300. The version number is increased each time there is a change in the content of the loader directory 300;

the number, NL 304, of MPEG tables of the Instream loader;

the version number, LVERS 306, of the Instream loader;

the number, NS 308, of MPEG tables of the software to be downloaded;

the version number, SVERS 310, of the software to be downloaded;

for each MPEG table of the Instream loader:

the identification, SEG_ID 312 of that MPEG table;

the TID extension, TID_EXT 314, of that MPEG table;

two redundant bytes, RES 316;

a maximum size, SECTION_LEN 318, of an MPEG section of that MPEG table;

a value, TIME_OUT 320, of the time-out for the loading of that MPEG table; and the value, SGN_SIGN 322, of the signature of that MPEG table;

for each MPEG table of the software:

the identification, SEG_ID 324 of that MPEG table;

the TID extension, TID_EXT 326, of that MPEG table;

two redundant bytes, RES 328;

a maximum size, SECTION_LEN 330, of an MPEG section of that MPEG table;

a value, TIME_OUT 332, of the time-out for the loading of that MPEG table; and the value, SIGN_SIGN 334, of the signature of that MPEG table;

an identification, KEY 336, of the private key used for the authentication of the loader directory 300; and a ciphered area, CIPH_AREA 338, containing the signature SIGN_L 340 of the loader directory 300, the signature being offset from the beginning of the CIPH_AREA 338 by a signature offset SGN_OFFSET 342.

During the updating a report is compiled, containing, inter alia, details on each step of the writing/updating process, for example, whether the step was successfully completed or not, so that the step at which writing/updating may have failed may be later identified. For example, the report includes:

the HVERSION 206 of the hardware directory 200;

if an error has occurred during the processing of the hardware directory 200, an indication of the type of error and the TID extension of the MPEG table of the hardware directory 200 at which the error occurred;

the LVERSION 302 of the loader directory;

if an error has occurred during the processing of the loader directory 300, an indication of the type of error and the TID extension of the MPEG table of the loader directory 300 at which the error occurred; and if an error has occurred during the processing of the Instream loader, an indication of the type of error and the TID extension of the MPEG table of the Instream loader at which the error occurred; and if an error has occurred during the processing of the software, an indication of the type of error and the TID extension of the MPEG table of the software at which the error occurred.

The report also includes the reason as to why writing/updating was performed, for example, at the request of an application, the number of software inconsistencies detected and the number of upgrade failures.

When updating resident software with software present in the MPEG bitstream at the request of an application, the receiver/decoder 2020 is arranged to compare the SVERS 310 of the software identified in the freshly downloaded loader directory table 300 with the version number of the resident software. If the SVERS 310 is later, then the modules associated with the resident software are erased from the FLASH memory 69 and the modules of the updated software are downloaded and mounted.

A front panel LED display 4038 of the receiver/decoder 2020 is adapted to display messages to the user of the receiver/decoder 2020 during the downloading of data. For example, the four following messages are specified in a parameter field stored in the FLASH memory 69 of the receiver/decoder 2020:

a "LOAD" message, indicating that writing/updating is proceeding in a "normal" state, that is, at the request of an application;

a "NATIV" message, indicating that updating is proceeding in a "native" state, that is, because the resident software has become corrupted; =a "OOO" message, indicating that the Bootstrap loader 100 is unable to perform the writing/updating because it is unable to locate consistent or valid parameters (such as the frequency to which the MPEG tuner 4028 is to be set or the PID of the MPEG bitstream) in the memory of the receiver/decoder 2020; and an "ERRL" message, indicating that an error, other than those specified with reference to the 000 message, has occurred during writing/updating.

As an alternative to static messages, messages in the form of an animated cartoon may be displayed on the receiver/decoder.

The steps in, for example, the updating of the resident software will now be described with reference to FIGS. 13A–D.

Figure 13A:
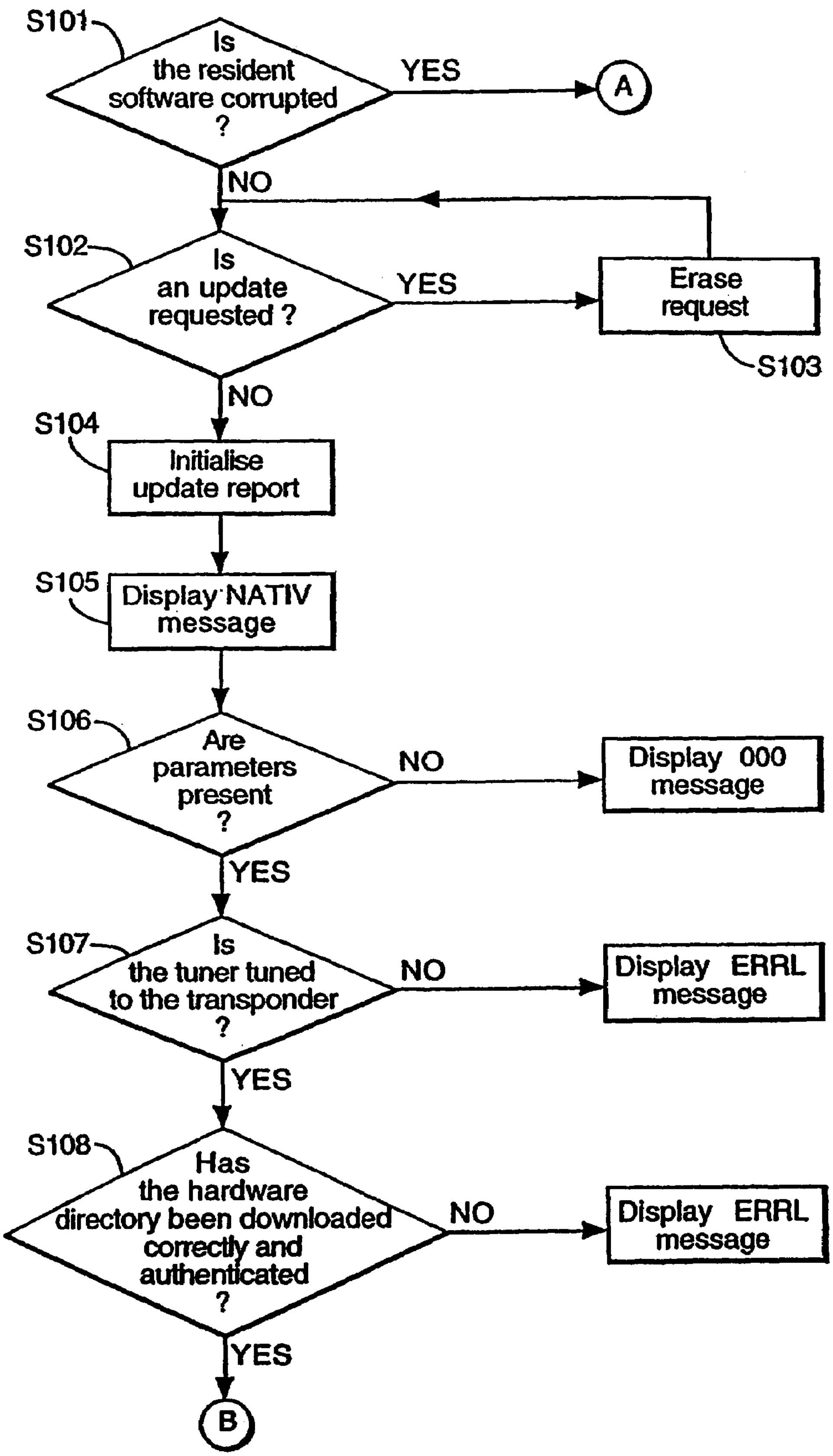

In step S101 of FIG. 13A, software stored in the receiver/decoder checks the integrity of any resident software by performing the checksum calculation and comparing the result of that calculation with the value of the checksum stored in the resident software. If the two values are different, then updating continues in the native state; if the two values are the same, or if no resident software is located, then updating continues in the normal state.

In this native state, it is then determined whether a previous update request is still pending in step S102. If such an update request from an application is pending, that request is erased in step S103 and step S102 is repeated. If no such update request is still pending, the report of the previous updating is erased in step S104 and initialised in order to commence the logging of this updating. The report logs the reason for the updating request, that is, to replace corrupted software.

Following step S104, the NATIV message is displayed on the display 4038 of the receiver/decoder 2020 in step S105.

In step S106, the parameters stored in the parameter fields of the EEPROM and FLASH memory 69 are checked. If the tuning parameters and/or the PID parameter are not defined, the display 4038 is caused to display the OOO message and the updating is aborted.

If these parameters are defined in the parameter field, the updating proceeds to step S107, in which the Bootstrap loader 100 tunes the MPEG tuner 4028 to the transponder 2014 in accordance with the parameters stored in the parameter fields. If the tuning fails, the updating is aborted and the ERRL message is displayed.

If the tuning is successful, the Bootstrap loader 100 downloads and authenticates the hardware directory 200 in step S108. If the hardware directory 200 is not downloaded before the time-out is reached, or if the hardware directory 200 is not authenticated (as an error has occurred during the downloading), the updating is aborted and the ERRL message displayed.

Figure 13B:
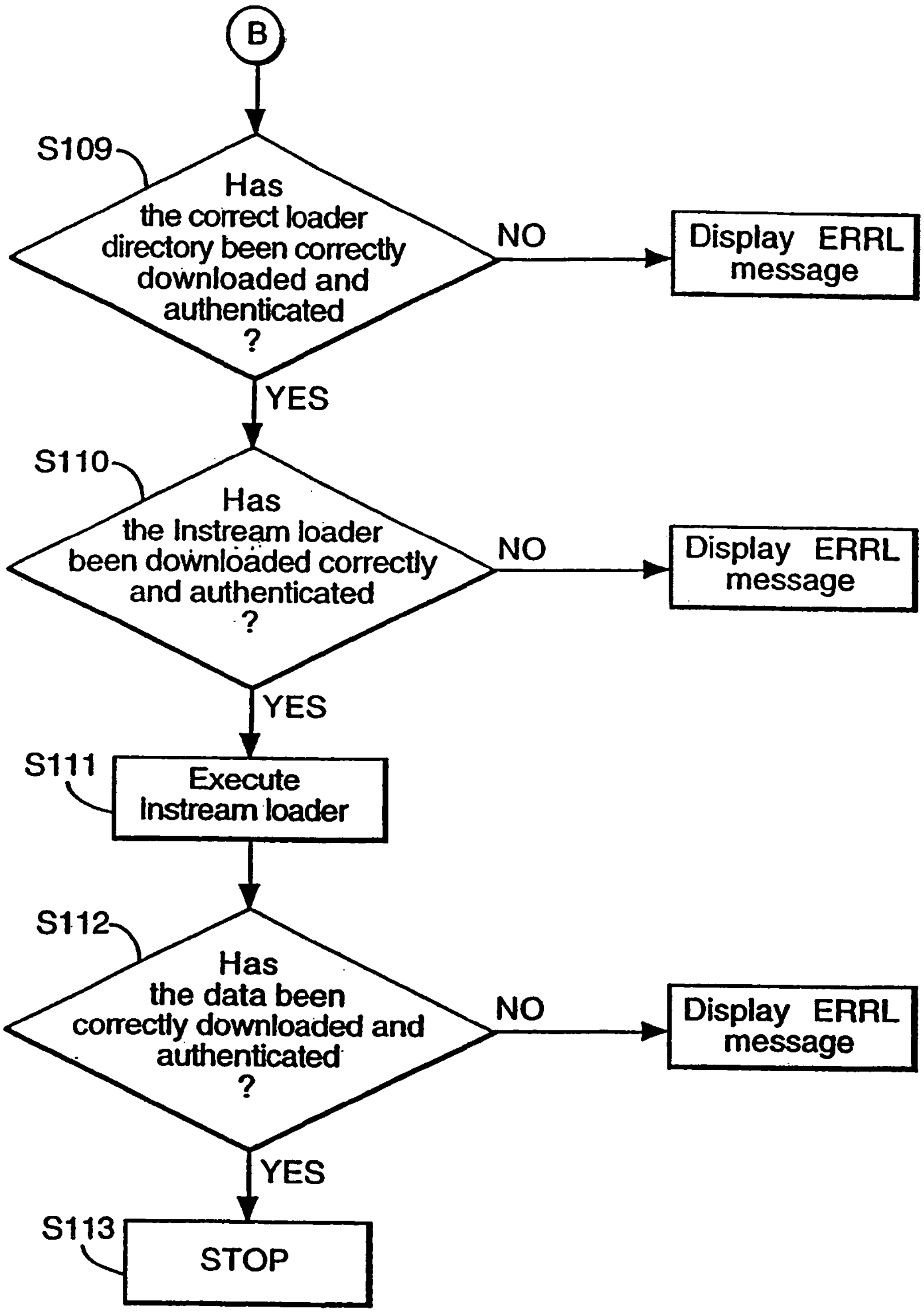

Referring to FIG. 13B, if such an entry is located, the Bootstrap loader 100 reads the TID 212 of the MPEG tables used for the loader directory 300 associated with that HVN 210, the Instream loader and the software to be downloaded and, in step S109, downloads and authenticates the correct loader directory 300. If the loader directory 300 is not downloaded before the time-out is reached, or if the loader directory is not authenticated (as an error has occurred during the downloading), the updating is aborted and the ERRL message displayed.

If downloading and authentication are successful, the Bootstrap loader 100 downloads the Instream loader from the MPEG bitstream into the RAM 72 of the receiver/decoder 2020 in step S110. If the Instream loader is not downloaded before the time-out is reached, or if the Instream loader is not authenticated (as an error has occurred during the downloading), the updating is aborted and the ERRL message displayed.

If the Instream loader is successfully loaded and authenticated, the Instream loader is executed in step S111 and, in step S112, the corrupted portion of the resident software is erased and the segments of the software to be downloaded are downloaded by the Instream loader, authenticated and written in the appropriate address location in FLASH memory 69. If the software is not downloaded before the time-out is reached, or if the software is not authenticated (as an error has occurred during the downloading) or if an error occurs during the writing of the software into the FLASH memory 69, the updating is aborted and the ERRL message displayed.

If the resident software is successfully updated, the writing of the report is stopped in step S113 and the receiver/decoder 2020 reset to enable a further updating to be commenced.

In any steps at which the updating is aborted, the step may alternatively be reperformed a prescribed number of times until successfully completed or until a time-out for performing that step is reached.

Figure 13C:
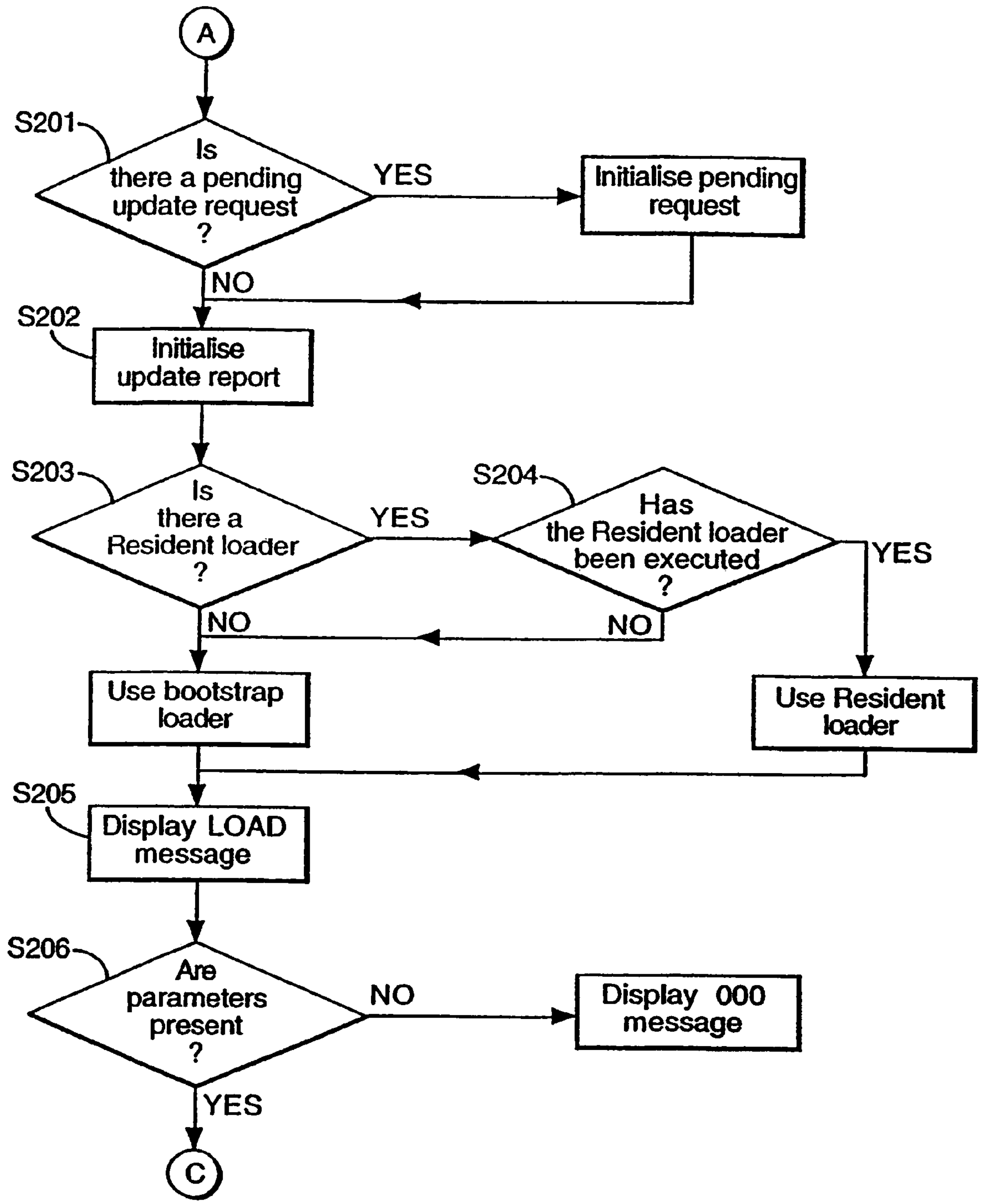

Referring to FIG. 13C, if updating is to proceed in the normal state, the Bootstrap loader 100 determines in step S201 whether an update request from an application is already pending. If not, the updating continues as normal. If there is already a pending update request then the pending request is processed first.

The report of the previous updating is erased in step S202 and initialised in order to commence the logging of this updating. The report logs the reason for the updating request, for example, at the request of an application, and any updating options that are selected by the application.

It is then determined, in step S203, whether a Resident loader is stored in the FLASH memory 69 of the receiver/decoder 2020. If such a loader is stored in the receiver/decoder, it is determined in step S204 whether the Resident loader has been executed in response to a command from software stored in the receiver/decoder 2020.

If the Resident loader has been executed, then the Resident loader performs subsequent steps in the updating process that would normally be carried out by the Bootstrap loader 100.

If the Resident loader is not present, or has not been executed, then the Bootstrap loader 100 is used. It is also possible for the software stored in the receiver/decoder 2020 to force the Bootstrap loader 100 to continue the updating process even if a Resident loader is stored in the FLASH memory 69.

The LOAD message is displayed on the display 4038 of the receiver/decoder 2020 in step S205.

In step S206, the parameters stored in the parameter fields of the EEPROM and FLASH memory 69 are checked. If the tuning parameters and/or the PID parameter are not defined, the display 4038 is caused to display the OOO message and the updating is aborted.

Figure 13D:
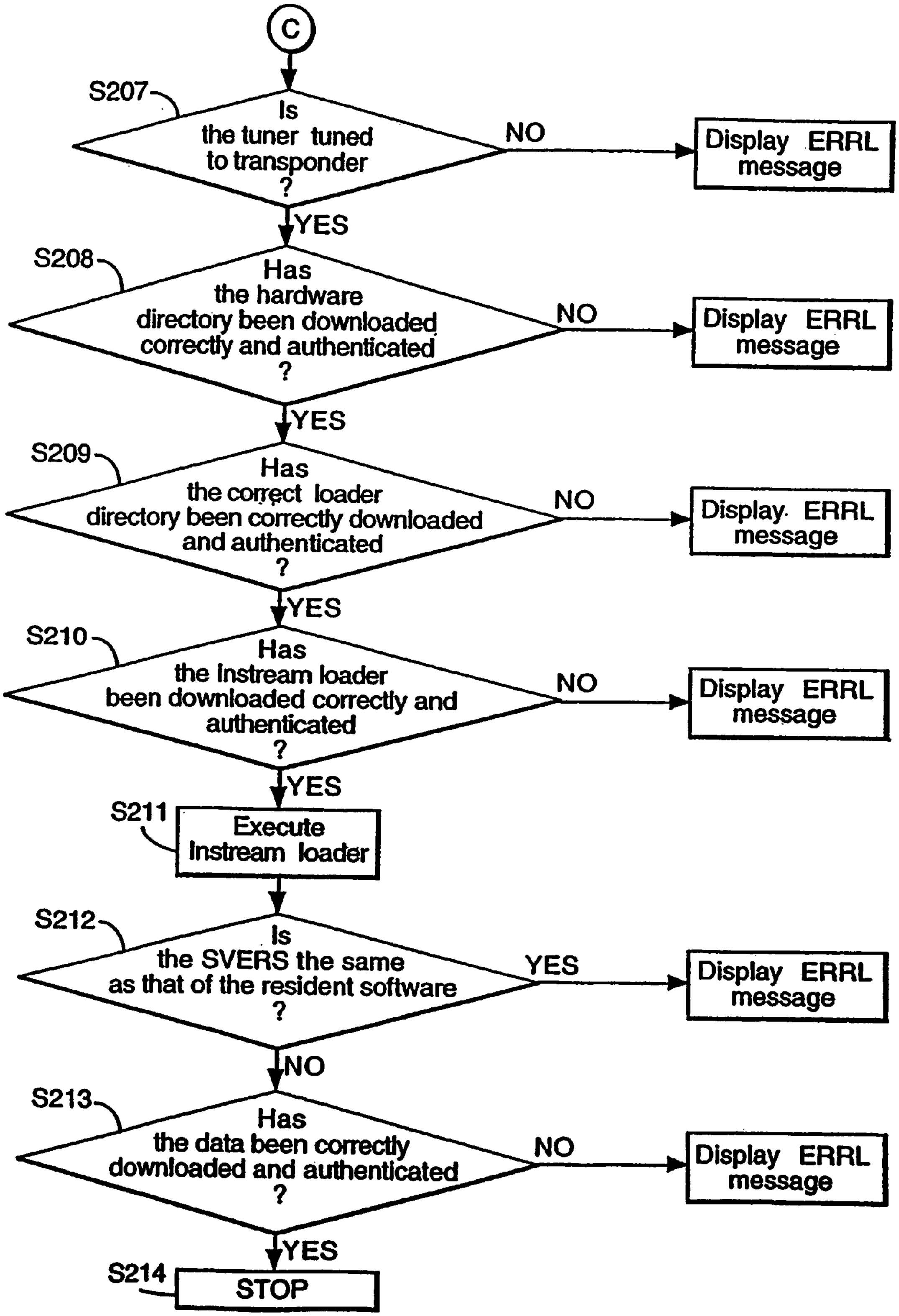

Referring to FIG. 13D, if these parameters are defined in the parameter field, the updating proceeds to step S207, in which the Bootstrap or Resident loader tunes the tuner 4028 to the transponder 2014 in accordance with the parameters stored in the parameter fields. If the tuning fails, the updating is aborted and the ERRL message is displayed.

If the tuning is successful, the Bootstrap or Resident loader downloads and authenticates the hardware directory 200 in step S208. If the hardware directory 200 is not downloaded before the time-out is reached, if the hardware directory is not authenticated (as an error has occurred during the downloading) or, depending on an option selected by the application requesting the updating, if a successful updating has been carried out using a hardware directory having the same HVERSION 206, the updating is aborted and the ERRL message displayed.

If downloading and authentication are successful and the updating is enabled by the application, the Bootstrap or Resident loader searches for an HVN 210 corresponding to the version number of the receiver/decoder 2020, as defined in a parameters field. If such an HVN is not located, the updating is aborted and the ERRL message displayed.

If such an entry is located, the Bootstrap or Resident loader reads the TID 212 of the MPEG tables used for the loader directory 300 associated with that HVN 210, the Instream loader and the software to be downloaded and, in step S209, downloads and authenticates the correct loader directory 300.

If the loader directory 300 is not downloaded before the time-out is reached, if the loader directory is not authenticated (as an error has occurred during the downloading), or, depending on an option selected by the application requesting the updating, if a successful updating has been carried out using a loader directory having the same LVERS 306, the updating is aborted and the ERRL message displayed.

If downloading and authentication are successful and the updating is enabled by the application, the Bootstrap loader 100 downloads the Instream loader from the MPEG bitstream into the RAM 72 of the receiver/decoder 2020 in step S210. If the Instream loader is not downloaded before the time-out is reached, or if the Instream loader is not authenticated (as an error has occurred during the downloading), the updating is aborted and the ERRL message displayed.

If the Instream loader is successfully loaded and authenticated, the Instream loader is executed in step S211 and, in step S212, the version number SVERS 310 of the software in the MPEG bitstream is compared to that of the resident software.

If the version numbers are the same, the writing of the software into the FLASH memory 69 is not performed and the application update request is erased. If the version numbers are different, the resident software is erased and the segments of the software to be downloaded are downloaded by the Instream loader, authenticated and written in the FLASH memory 69 in step S213.

If the software is not downloaded before the time-out is reached, or if the software is not authenticated (as an error has occurred during the downloading) or if an error occurs during the writing of the software into the FLASH memory 69, the updating is aborted and the ERRL message displayed.

If the resident software is successfully updated, the writing of the report is stopped in step S214, the pending update request is erased and the receiver/decoder 2020 reset to enable a further updating to be commenced.

As in the native state, in any steps at which the updating is aborted, the step may alternatively be reperformed until successfully completed.

It will be understood that the present invention has been described above purely by way of example, and modifications of detail can be made within the scope of the invention.

Each feature disclosed in the description, and (where appropriate) the claims and drawings may be provided independently or in any appropriate combination. In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

What is claimed is:

1. A method of transmitting and downloading a replacement version of resident software to a receiver/decoder comprising a bootstrap loader, comprising the steps, at the receiver/decoder of:
   - receiving a bitstream including an instream loader and the replacement version of resident software comprising a resident loader for replacing the bootstrap loader;
   - downloading into the receiver/decoder the instream loader for loading the replacement version of resident software comprising the resident loader from the bitstream using the bootstrap loader;
   - downloading the replacement version of resident software comprising the resident loader into the receiver/decoder from the bitstream using said instream loader, and
   - storing said replacement version of resident software comprising the resident loader into the receiver/decoder.

2. The method according to claim 1, wherein the instream loader is deleted from the receiver/decoder after the replacement version of the resident software has been downloaded from the bitstream.

3. The method according to claim 1, wherein the instream loader is subsequently stored in non-volatile memory of the receiver/decoder.

4. The method according to claim 3, wherein the non-volatile memory is a Flash memory volume of the receiver/decoder.

5. The method according to claim 1, wherein a portion only of the replacement version of the resident software stored in the receiver/decoder is replaced by a corresponding portion of the replacement version of the resident software downloaded by the instream loader.

6. The method according to claim 1, comprising the steps, at a transmission system, of:
   - dividing the at least one instream loader into a plurality of modules; and
   - dividing the software into a respective plurality of modules, each plurality of the software modules being associated with a respective plurality of instream loader modules.

7. The method according to claim 6, further comprising:
   - formatting the plurality of instream loader modules as respective tables, the tables having the same respective table identification ("TID") and respective different table identification extensions ("TID-extensions); and
   - formatting the plurality of the software modules as a respective table, the tables having the same respective TID as the tables of the instream loader modules associated therewith and respective different TID.

8. The method according to claim 7, further comprising downloading module tables having the same TID.

9. The method according to claim 6, wherein said tables have respective different TID-extensions other than a predetermined TID-extension, and further comprising:
   - generating a respective directory table for the plurality of modules having the same TID, the directory table having said predetermined TID-extension and the same TID, the directory table containing for the plurality of modules a name of a module and a respective TID-extension.

10. The method according to claim 9, further comprising:
   - downloading one of the tables having the predetermined TID-extension so as to download a directory table;
   - determining from the content of the directory table the TID-extensions of the module tables having the same TID as the directory table; and
   - downloading the module tables having the same TID as that of the downloaded directory table and TID-extensions determined from the downloaded directory table.

11. The method according to claim 9, further comprising:
   - including in a transmitted directory table a directory version identification therefor;
   - determining at the receiver/decoder whether the directory version identification of a currently transmitted directory table is more recent that the directory version identification of a previously downloaded directory table having the same TID as said currently transmitted table; and aborting downloading the data if the currently transmitted directory table is not more recent.

12. The method according to claim 1, further comprising:

generating a directory table having a predetermined table identification ("TID") and containing, for a plurality of version identifications of a receiver/decoder, a respective TID associated with that version identification.

13. The method according to claim 12, wherein the version identification comprises a code for the version of the receiver/decoder and a code for the manufacturer of the receiver/decoder.

14. The method according to claim 13, further comprising:

downloading said directory table having the predetermined TID; and determining the version identification of the receiver/decoder, wherein downloading a directory table comprises downloading that one of the tables having a TID associated with a version number of the receiver/decoder and a predetermined TID-extension.

15. The method according to claim 1, further comprising:

including in the bitstream a software version identification of the replacement version of the resident software;

determining, at the receiver/decoder, whether the software version identification of received replacement version of the resident software is more recent than the software version identification of currently stored replacement version of the resident software; and downloading the received replacement version of the resident software from the bitstream if the received replacement version of the resident software is more recent.

16. The method according to claim 1, further comprising:

transmitting a resident loader included in said bitstream, to the receiver/decoder;

downloading the resident loader, at the receiver/decoder; and downloading the instream loader and the replacement version of the resident software using the resident loader.

17. A receiver/decoder comprising:

a bootstrap loader for downloading an instream loader from a bitstream;

a receiver for receiving the bitstream including a replacement version of resident software comprising a resident loader for replacing the bootstrap loader and an instream loader;

a storage means configured to store the replacement version of the resident software and the instream loader; and a downloading means configured to download the instream loader into the storage means from the bitstream, wherein the receiver/decoder is configured to execute the instream loader, and wherein the instream loader is configured to download the replacement version of the resident software comprising the resident loader into the storage means.

18. The receiver/decoder according to claim 17, further comprising means for deleting the instream loader from the storage means after the replacement version of the resident software has been downloaded from the bitstream.

19. The receiver/decoder according to claim 17, further comprising a non-volatile memory for storing the instream loader after the replacement version of the resident software has been downloaded from the bitstream.

20. The receiver/decoder according to claim 19, wherein the non-volatile memory is a Flash memory volume of the receiver/decoder.

21. The receiver/decoder according to claim 17, wherein the instream loader is adapted to replace a portion only of the replacement version of the resident software stored in the receiver/decoder by a corresponding portion of the replacement version of the resident software downloaded thereby.

22. The receiver/decoder according to claim 17, arranged to download tables.

23. The receiver/decoder according to claim 22, wherein said downloading means is arranged to download a table having a table identification ("TID") and a predetermined table identification extension ("TID-extension") so as to download a directory table, to determine from the content of the directory table the TID-extensions of module tables having the same TID as the directory table, and to download the module tables having the same TID as that of the downloaded directory table and TID-extensions determined from the downloaded directory table so as to download said instream loader.

24. The receiver/decoder according to claim 23, wherein said downloading means is arranged to determine whether a directory version identification of a currently transmitted directory table is more recent than the directory version identification of a previously downloaded directory table having the same TID as the currently transmitted directory table, and if not, to abort the downloading of said instream loader.

25. The receiver/decoder according to claim 22, wherein said downloading means is arranged to download a directory table having a predetermined TID and containing, for each of a plurality of version identifications of a receiver/decoder, a respective TID associated with that version identification, to determine the version identification of the receiver/decoder, and to download a directory table having a TID associated with a version number of the receiver/decoder and a predetermined TID-extension.

26. The receiver/decoder according to claim 17, wherein said downloading means is arranged to download a second resident loader included in the replacement version of the resident software included in said bitstream for downloading instream loader and the replacement version of the resident software.

27. A signal including at least one instream loader for loading a replacement version of resident software into a receiver/decoder, and the replacement version of the resident software associated with the at least one instream loader, wherein the at least one instream loader is divided into a plurality of modules and the replacement version of the resident software associated with the at least one instream loader is divided into a respective plurality of modules, wherein the replacement version of the resident software comprises a resident loader for replacing a bootstrap loader of the receiver/decoder.

28. A transmission system comprising:

means for transmitting a bitstream including at least one instream loader for loading a replacement version of resident software into a receiver/decoder, and the replacement version of the resident software associated with the at least one instream loader; and means for dividing the at least one instream loader into a plurality of modules and dividing the replacement version of the resident software associated with the at least one instream loader into a respective plurality of modules for transmittal by said transmitting means.

29. The transmission system according to claim 28, further comprising:

means for generating a directory table having a predetermined table identification ("TID") and containing, for each of a plurality of version identifications of a receiver/decoder, a respective TID associated with that version identification.

30. The transmission system according to claim 28, further comprising means for including in each transmitted table a version identification therefor.

31. The transmission system according to claim 28, further comprising:

means for formatting each of the modules of the at least one instream loader as a respective table, the table of the at least one instream loader having the same respective table identification ("TID") and respective different table identification extensions ("TID-extensions"); and means for formatting each of the modules of the replacement version of the resident software associated with the at least one instream loader as a respective table, the table of the modules of data having the same respective TID as the tables of the instream loader modules associated therewith and respective different TID-extensions.

32. The transmission system according to claim 31, wherein said tables have respective different TID-extensions other than a predetermined TID-extension; said system further comprising means for generating a respective directory tables for the plurality of modules having the same TID, each directory table having that TID and said predetermined TID-extension, the directory table containing for each of the modules a name of that module and the respective TID-extension.

33. A method for updating resident software to a receiver/decoder, comprising:

downloading an instream loader using a bootstrap loader into the receiver/decoder;

downloading an updated resident software using the instream loader into the receiver/decoder, wherein the updated resident software comprises a resident loader;

updating the resident software in the receiver/decoder, wherein updating the resident software comprises replacing the bootstrap loader with the resident loader; and deleting the instream loader from the receiver/decoder.

34. A receiver/decoder, comprising:

resident software executing on the receiver/decoder, a bootstrap loader configured to download a loader from a bit stream; and a memory configured to store the loader and the resident software, wherein the loader is configured to download an updated version of the resident software, and wherein the receiver/decoder is configured to update the resident bootstrap loader using the updated version of the resident software;

wherein the receiver/decoded is configured to delete the loader once the resident software is updated.

* * * * *